(12) United States Patent
Zhang et al.

(10) Patent No.: US 12,231,760 B2
(45) Date of Patent: Feb. 18, 2025

(54) METHOD, APPARATUS, COMPUTATIONAL EQUIPMENT, AND STORAGE MEDIUM FOR VIDEO CAPTURE

(71) Applicant: Arashi Vision Inc. (Insta360), Shenzhen (CN)

(72) Inventors: Weijun Zhang, Shenzhen (CN); Jingkang Liu, Shenzhen (CN); Xiao Yuqi Liu, Shenzhen (CN); Xianhong Jiang, Shenzhen (CN)

(73) Assignee: Arashi Vision Inc. (Insta360), Shenzhen (CN)

( * ) Notice: Subject to any disclaimer, the term of this patent is extended or adjusted under 35 U.S.C. 154(b) by 0 days.

(21) Appl. No.: 18/614,979

(22) Filed: Mar. 25, 2024

(65) Prior Publication Data
US 2024/0406534 A1    Dec. 5, 2024

(30) Foreign Application Priority Data

May 29, 2023  (CN) .......................... 202310617917.5

(51) Int. Cl.
*H04N 23/61* (2023.01)
*G06T 7/73* (2017.01)
(Continued)

(52) U.S. Cl.
CPC ............. *H04N 23/61* (2023.01); *G06T 7/74* (2017.01); *G06V 10/44* (2022.01); *G06V 10/761* (2022.01);
(Continued)

(58) Field of Classification Search
None
See application file for complete search history.

(56) References Cited

U.S. PATENT DOCUMENTS

2017/0064180 A1*  3/2017  Kitagawa ............... G06V 10/25
2017/0302719 A1* 10/2017  Chen ........................ H04L 65/61

FOREIGN PATENT DOCUMENTS

| CN | 108734726 A | 11/2018 |
| CN | 110188691 A | 8/2019 |
| JP | 7-30795 A | 1/1995 |

OTHER PUBLICATIONS

Chinese Office Action issued Nov. 17, 2023 in Application No. 202310617917.5.
(Continued)

*Primary Examiner* — Christopher Braniff
(74) *Attorney, Agent, or Firm* — Sughrue Mion, PLLC

(57) ABSTRACT

Provided is a method for capturing video, the method including during a process of capturing video content, based on detecting missing-object content in which a target object is not included in a frame, using video content recorded prior to the missing-object content to obtain information regarding a location of the target object, a timestamp of the video content recorded prior to the missing-object content being earlier than a timestamp of the missing-object content, based on the location information obtained for the target object, adjusting a recording equipment's capturing direction, obtaining a post-adjustment recording direction of the recording equipment, decreasing a zoom factor of the recording equipment and obtaining a post-decrease zoom factor, and performing reidentification of the target object and continuing to capture video content with the target object included in the frame based on at least one of the post-decrease zoom factor and the post-adjustment recording direction.

21 Claims, 14 Drawing Sheets

(51) Int. Cl.
*G06V 10/44* (2022.01)
*G06V 10/74* (2022.01)
*G06V 20/40* (2022.01)
*H04N 23/69* (2023.01)
*H04N 23/695* (2023.01)

(52) U.S. Cl.
CPC ............. *G06V 20/46* (2022.01); *H04N 23/69* (2023.01); *H04N 23/695* (2023.01)

(56) References Cited

OTHER PUBLICATIONS

Chinese Office Action issued Feb. 8, 2024 in Application No. 202310617917.5.

\* cited by examiner

FIG. 2

During the process of capturing video footage, upon detecting missing-object footage in which the target object does not exist within the frame, using video footage recorded prior to the missing-object footage in order to collect information regarding the location of the target object, the timestamp of such video footage recorded prior to the missing-object footage being earlier than the timestamp of the missing-object footage. — S202

↓

Based on the location information collected for the target object, making adjustments to the recording equipment's direction of video capture, after which a post-adjustment recording direction is obtained, and/or, decreasing the zoom factor of the recording equipment, after which a post-decrease zoom factor is obtained. — S204

↓

Decreasing the zoom factor of the recording equipment, after which a post-decrease zoom factor is obtained. — S206

↓

Based on the post-decrease zoom factor and/or the post-adjustment recording direction, performing reidentification of an object matching the target object and continuing to capture video footage with the target object in-frame. — S208

METHOD, APPARATUS, COMPUTATIONAL EQUIPMENT, AND STORAGE MEDIUM FOR VIDEO CAPTURE

CROSS-REFERENCE TO RELATED APPLICATION

This application claims priority to Chinese Patent Application No. CN202310617917.5A, filed on May 29, 2023 with the China National Intellectual Property Administration, the disclosure of which is incorporated by reference herein in its entirety.

BACKGROUND

1. Field

Example embodiments of the present disclosure relate to an image processing technology, and particularly involves a method, apparatus, computational equipment, storage medium, and computer program for capturing video.

2. Description of Related Art

In related methods, in image processing, during the process of recording the location of a target object, object tracking technology can be based on methods of optical flow, template matching, image feature points, correlation filter technologies, deep learning, and the like.

Therefore, when the target of such processing is obscured by another person or object, when quick movement leads the target out of frame, or under other similar circumstances; it may be easier for tracking of the target to be lost. The primary insufficiencies seen within related technologies include an effective mechanism for recapturing the target.

SUMMARY

One or more example embodiments provide an image processing technology, and particularly a method, apparatus, computational equipment, storage medium, and computer program for capturing video.

According to an aspect of an example embodiment, there is provided a method for capturing video, the method including during a process of capturing video content, based on detecting missing-object content in which a target object is not included in a frame, using video content recorded prior to the missing-object content to obtain information regarding a location of the target object, a timestamp of the video content recorded prior to the missing-object content being earlier than a timestamp of the missing-object content, based on the location information obtained for the target object, adjusting a recording equipment's capturing direction, obtaining a post-adjustment recording direction of the recording equipment, decreasing a zoom factor of the recording equipment and obtaining a post-decrease zoom factor, and performing reidentification of the target object and continuing to capture video content with the target object included in the frame based on at least one of the post-decrease zoom factor and the post-adjustment recording direction.

The method may further include determining specifications of key parts of the target object in a current video content that includes the target object, adjusting the zoom factor of the current video content based on discrepancy between the specifications of key parts of the target object and preset specifications to obtain the post-decrease zoom factor, and continuing to capture video content of the target object based on the post-decrease zoom factor.

The method may further include obtaining reference features of the target object, completing feature extraction for candidate target objects from the captured video content, and obtaining features of the candidate target objects, determining a level of similarity between the features of the candidate target objects and the reference features, and detecting missing-object content from each segment of the captured video content by determining which content includes characteristics corresponding to that from which the target object is known to be missing.

The method may further include obtaining a number of consecutive frames from which the target object is missing from a multi-frame video content recorded during a current session, and obtaining a number of consecutive missing object frames, and based on the number of the consecutive missing object frames satisfying requirements for detection of a missing object, recording the multi-frame video content during the current session being considered to be missing-object content.

The method may further include determining previously recorded a video content containing the target object from the video content recorded during the current session, and identifying in which areas in a vicinity of the boundary of the frame the target object is located from the previously recorded video content.

The method may further include, based on the target object being located at a left boundary of the frame in the previously recorded video content, adjusting the recording equipment's capturing direction based on the left boundary position, and based on the target object being located at a right boundary of the frame in the previously recorded video content, adjusting the recording equipment's capturing direction based on the right boundary position.

The method may further include, from a range of values between the zoom factor while recording missing-object content and the preset zoom factor, gradually decreasing the recording equipment's zoom factor, and obtaining a gradually decreasing zoom factor that is the post-decrease zoom factor.

The method may further include switching a lens included in the recording equipment to a second lens based on a requirement of the post-decrease zoom factor, during switching the lens, ceasing capturing of video until the lens change has been completed, controlling the capturing of video content with the second lens while awaiting reidentification, and based on reidentification of an object that corresponds to the target object within the video content captured by the second lens, continuing capturing of video content including the reidentified object.

The method may further include controlling a gradual increase of the post-decrease zoom factor, obtaining a post-increase zoom factor, switching to a second lens based on a requirement of the post-increase zoom factor, and increasing the post-increase zoom factor, until reaching the zoom factor in use at the time that the missing-object content was being recorded.

The requirement of at least one interval may be between the first switch in focal length and the second switch in focal length, the first switch in focal length may be a range of zoom factors while switching between an ultra wide-angle lens and a wide-angle lens, and the second switch in focal length may be a range of zoom factors while switching between a wide-angle lens and a telephoto lens.

The method may further include, based on the post-decrease zoom factor, increasing a scale of cropping in a true video content, obtaining the post-increase cropping scale; the true video content being a video content that is captured by the lens, decreasing a frame enlargement parameter of the true video content, obtaining the post-decrease frame enlargement parameter, based on at least one of the post-increase cropping scale and the post-decrease frame enlargement parameter, extracting video content to await reidentification processing from the true video content, and based on the identification of an object that matches the target object from the video content awaiting reidentification processing, continuing capturing of video content including the reidentified object.

According to another aspect of an embodiment, there is provided an apparatus configured to capture video, the apparatus including at least one processor being configured to be implemented as a location acquisition module configured to, during a process of capturing video footage, upon detection of missing-object content in which the target object is not included in a frame, use video content recorded prior to the missing-object content to obtain information regarding a location of the target object, a timestamp of the video content recorded prior to the missing-object content being earlier than a timestamp of the missing-object content, a parameter adjustment module configured to adjust a recording equipment's capturing direction based on the location information of the target object, to obtain a post-adjustment recording direction and to decrease the equipment's zoom factor, thereby obtaining a post-decrease zoom factor, and a content recapture module configured to obtain continued capture of video content including a reidentified object corresponding to the target object based on at least one of the post-decrease zoom factor and the post-adjustment recording direction.

According to another aspect of an embodiment, there is provided a handheld gimbal device including motors configured to control a rotation of the gimbal based on a post-adjustment recording direction, and a processor configured to perform operations of the method.

According to another aspect of an embodiment, there is provided a non-transitory computer-readable storage medium storing instructions configured to cause a processor to execute a method including during a process of capturing video content, based on detecting missing-object content in which a target object is not included in a frame, using video content recorded prior to the missing-object content to obtain information regarding a location of the target object, a timestamp of the video content recorded prior to the missing-object content being earlier than a timestamp of the missing-object content, based on the location information obtained for the target object, adjusting a recording equipment's capturing direction, obtaining a post-adjustment recording direction of the recording equipment, decreasing a zoom factor of the recording equipment and obtaining a post-decrease zoom factor, and performing reidentification of the target object and continuing to capture video content with the target object included in the frame based on at least one of the post-decrease zoom factor and the post-adjustment recording direction.

The method may further include determining specifications of key parts of the target object in a current video content that includes the target object, adjusting the zoom factor of the current video content based on discrepancy between the specifications of key parts of the target object and preset specifications to obtain the post-decrease zoom factor, and continuing to capture video content of the target object based on the post-decrease zoom factor.

The method may further include obtaining reference features of the target object, completing feature extraction for candidate target objects from the captured video content, and obtaining features of the candidate target objects, determining a level of similarity between the features of the candidate target objects and the reference features, and detecting missing-object content from each segment of the captured video content by determining which content includes characteristics corresponding to that from which the target object is known to be missing.

The method may further include obtaining a number of consecutive frames from which the target object is missing from a multi-frame video content recorded during a current session, and obtaining a number of consecutive missing object frames, and based on the number of the consecutive missing object frames satisfying requirements for detection of a missing object, recording the multi-frame video content during the current session being considered to be missing-object content.

The method may further include determining previously recorded a video content containing the target object from the video content recorded during the current session, and identifying in which areas in a vicinity of the boundary of the frame the target object is located from the previously recorded video content.

The method may further include, based on the target object being located at a left boundary of the frame in the previously recorded video content, adjusting the recording equipment's capturing direction based on the left boundary position, and based on the target object being located at a right boundary of the frame in the previously recorded video content, adjusting the recording equipment's capturing direction based on the right boundary position.

The method may further include, from a range of values between the zoom factor while recording missing-object content and the preset zoom factor, gradually decreasing the recording equipment's zoom factor, and obtaining a gradually decreasing zoom factor that is the post-decrease zoom factor.

The method may further include switching a lens included in the recording equipment to a second lens based on a requirement of the post-decrease zoom factor, during switching the lens, ceasing capturing of video until the lens change has been completed, controlling the capturing of video content with the second lens while awaiting reidentification, and based on reidentification of an object that corresponds to the target object within the video content captured by the second lens, continuing capturing of video content including the reidentified object.

BRIEF DESCRIPTION OF FIGURES

The above and other aspects, features, and advantages of certain embodiments of the disclosure will be more apparent from the following description taken in conjunction with the accompanying drawings, in which:

FIG. 2 illustrates a workflow diagram for capturing video according to an example embodiment;

DETAILED DESCRIPTION

Figure 1:
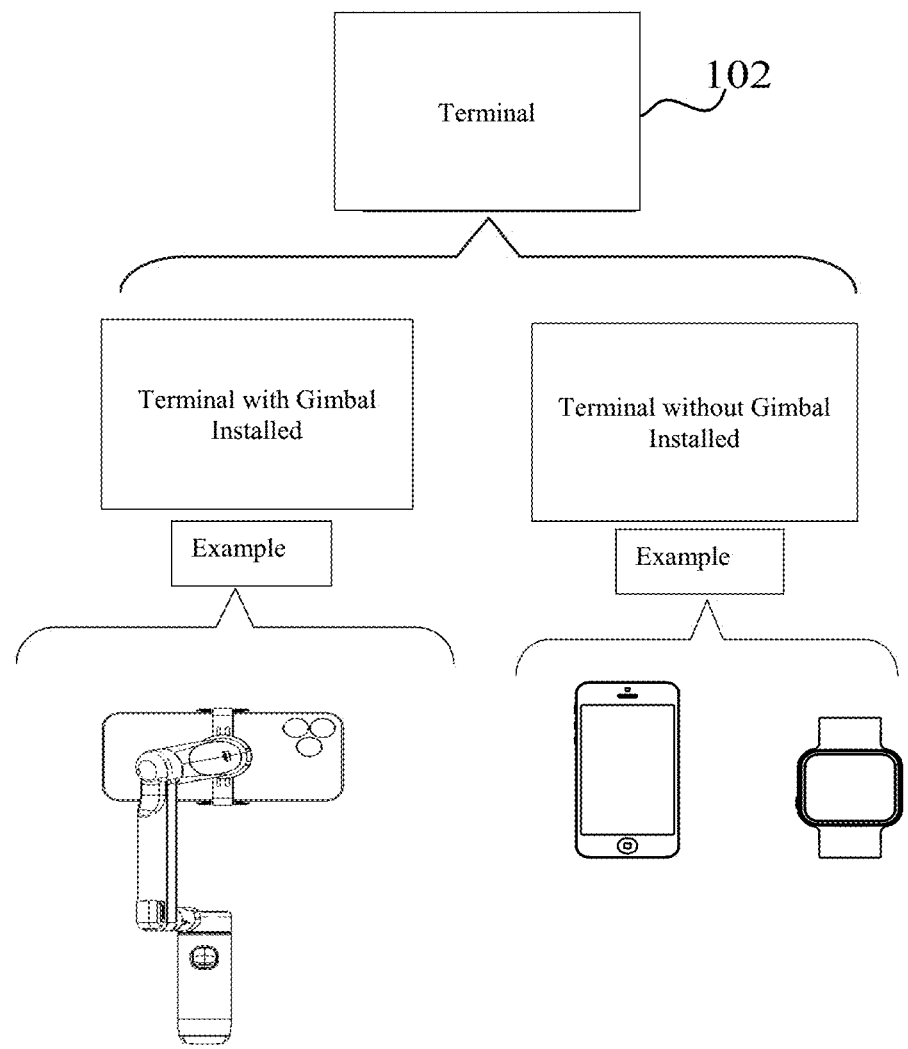
FIG. 1 illustrates an application environment for capturing video according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. For example, the expression, "at least one of a, b, and c," should be understood as including only a, only b, only c, both a and b, both a and c, both b and c, or all of a, b, and c.

Hereinafter, example embodiments will be described with reference to the accompanying drawings. The example embodiments described herein are for illustrative purposes only, and various modifications may be made therein. In the drawings, like reference numerals refer to like elements, and the sizes of elements may be exaggerated for clarity of illustration.

Although the terms "first" and "second" are used to describe various elements, these terms are only used to distinguish one element from another element. These terms do not limit elements to having different materials or structures.

The terms of a singular form may include plural forms unless otherwise mentioned. It will be further understood that the terms "comprises" and/or "comprising" used herein specify the presence of stated features or elements, but do not preclude the presence or addition of one or more other features or elements.

In the disclosure, terms such as "unit" or "module" may be used to denote a unit that has at least one function or operation and is implemented with hardware, software, or a combination of hardware and software.

An element referred to with the definite article or a demonstrative determiner may be construed as the element or the elements even though it has a singular form.

Operations of a method may be performed in appropriate order unless explicitly described in terms of order or described to the contrary. In addition, examples or exemplary terms (for example, "such as" and "etc.") are used for the purpose of description and are not intended to limit the scope of the inventive concept unless defined by the claims.

FIG. 1 illustrates an application environment for capturing video according to an example embodiment.

A method of capturing video content according to an example embodiment may be implemented in the application environment illustrated in FIG. 1. In this example, the terminal 102 may be, but is not limited to, a type of camera, camcorder, omnidirectional camera, action camera, personal computer, laptop computer, smartphone, tablet, or portable wearable, where said portable wearable can be a smart watch, smart bracelet, headset, etc. The terminal 102 may be fixed to the body of the gimbal via welding or other methods, and may also be connected to the body of a gimbal in such a way that it may be detached or rotated.

FIG. 2 illustrates a flow chart of a method for capturing video content according to an example embodiment.

In Step 202, during a process of capturing video content, upon detecting missing-object content in which the target object does not exist within the frame, video content recorded prior to the missing-object content is utilized in order to collect information regarding the location of the target object. The timestamp of video content recorded prior to the missing-object content is earlier than the timestamp of the missing-object content.

The target object is the object used to control the capturing of video content prior to the missing-object content. The target object could be, for example, any of a person, a pet, an item, or a virtual character, and video content of the target object may be captured based on information regarding the location of the target object within the video content. According to an example embodiment, information regarding the location of the target object may be determined using previously captured video content that contains the target object. Based on the location information, video tracking of the target object may be achieved by utilizing consecutive frames of captured video content that contain the target object. For example, when the timestamp of one frame of captured video content is the current timestamp, the next consecutive frame of captured video content would be the frame with the next consecutive timestamp, the reference frame of captured video content is the current frame, while the next consecutive frame of captured video content is the frame captured after the current frame.

Missing-object content may be at least one frame of video content recorded during the process of video content capture, and is used to characterize the end of the process of capturing video content of the target object. The target object does not exist within the missing-object content, while the previously recorded content may or may not contain the target object. As an option, missing-object content may be determined by comparing the level of similarity between certain objects within the video content and the target object, or determined based on pending missing-object content in which the target object does not exist, and in which case pending missing-object content is determined based on similarity levels.

Previously recorded content may be video content that contains the target object, and which has a timestamp that is earlier than the timestamp of the missing-object content. As an option, the previously recorded content may be the frame recorded prior to the missing-object content, or it may be multiple frames of content recorded prior to the missing-object content.

In an example embodiment, capturing video content may include utilizing a filter-based tracker or a Siamese network-based tracker, updating information regarding the target object in real time, and adjusting the recording equipment's capturing direction by rotating the gimbal, to ensure that the predicted location of the target object remains within the scope of the video content, and the location of the target object is detected. Based on the location of the target object being within the current content, it is determined whether or not the target object is being blocked or moving away from the scope of the field of view, until the content of the target object becomes a missing-object content.

Correspondingly, regarding missing-object content in which the target object does not exist within the frame includes when it is detected that the target object is currently being blocked or moving away from the scope of the field of view, then it is determined that the missing-object content in which the target object does not exist within the frame is being captured. As an option, the missing-object content may also be determined based on levels of similarity.

In Step 204, adjustments are made to the recording equipment's capturing direction based on information regarding the location of the target object, the post-adjustment recording direction is obtained, the equipment's zoom factor is decreased, and the post-decrease zoom factor is obtained.

The information regarding the location of the target object is acquired from the video content captured prior to the missing-object content, and this location information is used to determine the correlation between the target object and its location in the previously recorded video content. When the target object is located near an edge of the frame, the information regarding the location of the target object may be the corresponding region. For example, when the target object is located at the boundary to the left side of the frame in the previously recorded video content, the information regarding the location of the target object is characterized as the target object being located at the left boundary, and the recording equipment's capturing direction is adjusted based on the location of the left boundary.

The recording equipment's capturing direction is the direction in which the terminal is capturing video content, and the angle at which video content is captured by the terminal changes in synchrony with the recording direction. The recording equipment's capturing direction is used to indicate the rotation of the handheld gimbal. When it is detected that the target object is missing from the captured video content, the recording equipment's capturing direction is changed in synchrony based on the location of the target object. When the video content is considered to be a missing-object content, information regarding the location of the target object is determined from within the video content recorded prior to the missing-object content, and this location information is able to reflect the target object's predicted direction of movement. The recording equipment's capturing direction is thereby adjusted based on this location information, and the post-adjustment recording direction is obtained, such that the post-adjustment recording direction is adjusted to follow the target object's predicted direction of movement, and the target object may be found using this predicted direction of movement.

Based on the video content awaiting identification captured by the post-adjustment recording direction, the possible location of the target object may be estimated according to the state of the target object prior to going missing. The lens of the camera is rotated to find the re-identified object by changing the recording equipment's capturing video capturing direction through control of the rotation of the camera's gimbal.

The recording equipment's zoom factor is the zoom factor at the time that the terminal is acquiring video content, and the field of view of the video content captured by the terminal changes in synchrony with the recording direction. The recording equipment's zoom factor may be negatively correlated with the field of view of the video content captured by the terminal. Under different modes of capturing video content, the recording equipment's zoom factor may have various and changing connections to the target object. Under one particular mode of capture, the recording equipment's zoom factor may change based on predicted movement direction of the target object, and under another mode of capture, the recording equipment's zoom factor is not necessarily linked to predicted movement direction of the target object.

The post-decrease zoom factor is used to broaden the field of view corresponding with the video content under conditions in which missing-object content is detected, in order to capture video content with the broadened field of view. According to an embodiment, the post-decrease zoom factor may be used to control the switching between multiple lenses with different zoom factor ranges, and may also be used to control the cropping or enlargement of a true video content.

According to another example embodiment, under conditions in which missing-object content is detected, reducing the zoom factor of the camera and broadening the field of view of the content facilitates searching for an object within a larger scope. The zoom factor may be adjusted through the hardware interface that controls the camera.

In Step 206, continued capturing of video content with a reidentified object that matches the target object is achieved based on the post-decrease zoom factor and/or post-adjustment recording direction.

The reidentified object is the target object after reidentification. The reidentified object is a recorded object that matches the target object, and has been reidentified after the target object has gone missing from the frame. The object that is reidentified following the missing-object content matches the target object, implying that the reidentified object and the target object are the same recorded object. According to an embodiment, during the process of capturing video content of the target object, when different missing-object content exists during different and separate time intervals, then a distinct target object and reidentified object may exist for each time interval. The target object within a particular time interval may be unchanged from the beginning of the recording, or may be the reidentified object determined during the previous time interval.

According to an embodiment, when the reidentified object is identified from within the video content awaiting identification, the video content awaiting identification may be all of the video content captured following the post-adjustment recording direction, or may be all of the video content captured using the broadened field of view achieved by the post-decrease zoom factor, or may be all of the video content captured following the post-adjustment recording direction and the broadened field of view achieved by the post-decrease zoom factor.

According to an embodiment, when the reidentified object is detected from within the video content awaiting identification, continued capturing of video content containing the reidentified object may be achieved. According to an example embodiment, the process of capturing the video content awaiting identification may include pointing in a gradually adjusted direction of capture, and capturing video content by gradually decreasing the zoom factor in order to obtain video content of the reidentified object.

According to an embodiment, the process of determining whether or not a reidentified object exists within video content awaiting identification may include, from within the video content containing the target object, determining reference characteristics of the target object, matching characteristics of candidate objects extracted from each frame of the video content awaiting identification with these reference characteristics, when characteristics of candidate objects that match the reference characteristics are detected, determining that a reidentified object matching the target object exists within the video content awaiting identification.

In an example embodiment, during the process of broadening the field of view and/or rotating the lens, a target reidentification algorithm is utilized to search for targets within the new field of view in order to obtain the reidentified object. Deep learning models such as, for example, Siamese networks, ReID networks, etc. are used to acquire characteristics of candidate objects, and these candidate objects are matched with the target object through characteristic matching algorithms such as cosine similarity and Euclidean distance in order to determine that a reidentified object from within the video content awaiting identification matches the target object.

In an example embodiment, when a reidentified object is found within the new field of view that has a relatively high level of similarity with the characteristics of the target object, it is determined that the reidentified object is considered the rediscovered target object, achieving the resumption of target tracking. After resuming tracking, the zoom factor is returned to its original value, a default value or the zoom factor at the time the missing-object content was captured, returning the content to its normal field of view, and proceeding to follow Step 202, the process of capturing video content.

Figure 3A:
FIGS. 3A and 3B are schematic diagrams of the video content captured at Time A according to an example embodiment.
Figure 3B:
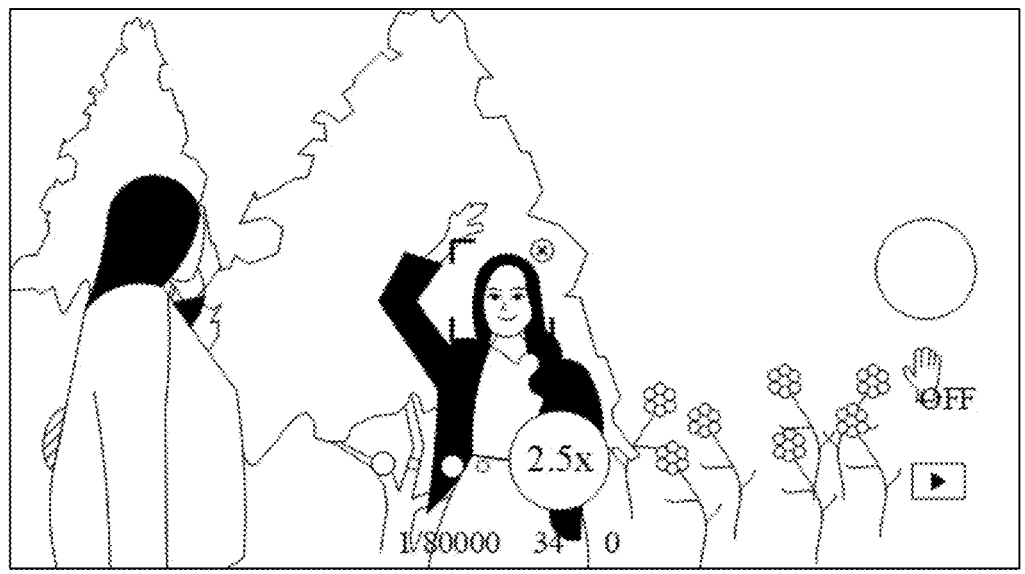
Figure 4A:
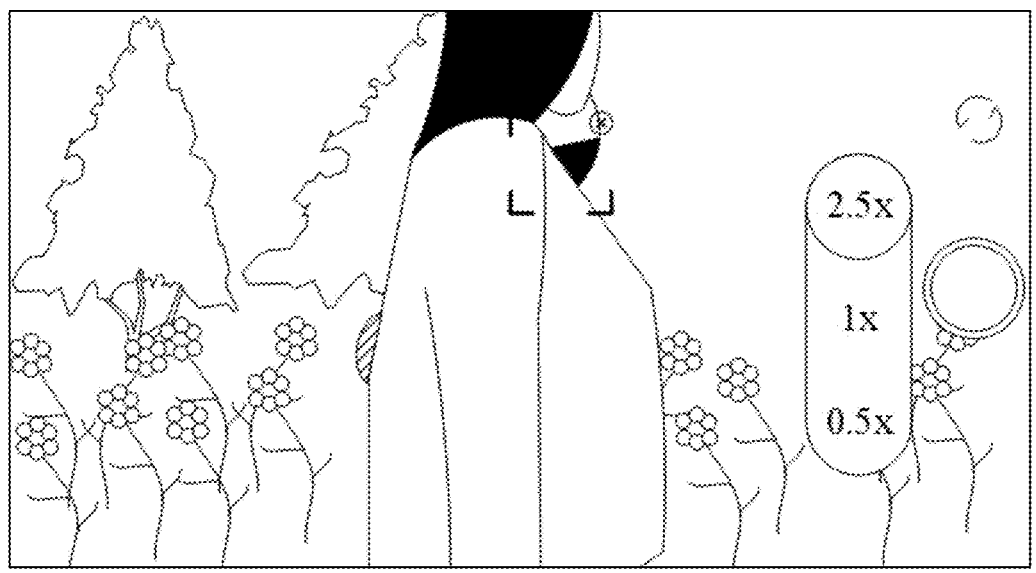
FIGS. 4A and 4B are schematic diagrams of a pending lost video content captured at Time B according to an example embodiment.
Figure 4B:
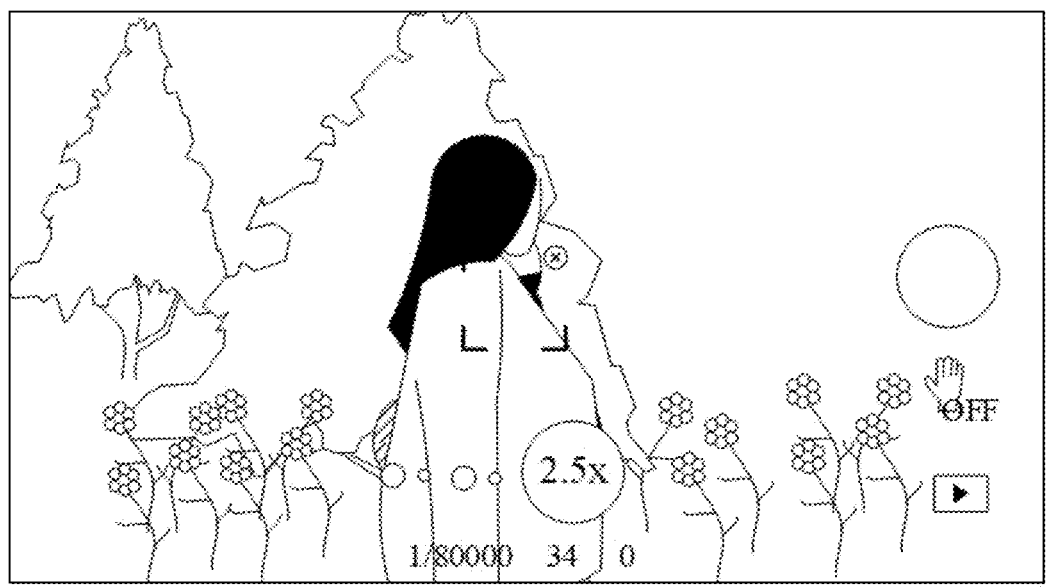
Figure 5A:
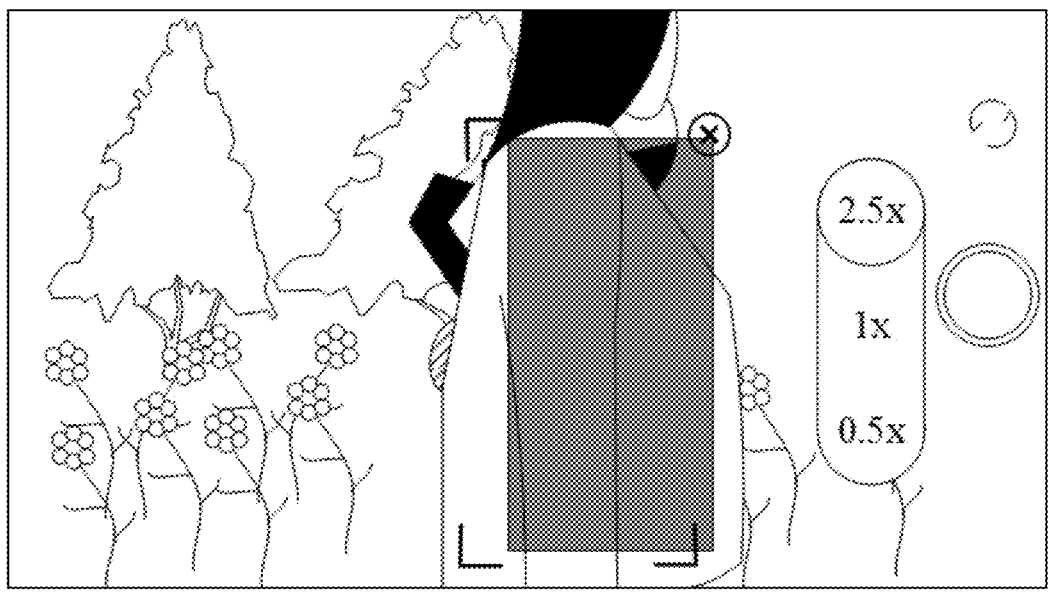
FIGS. 5A and 5B are schematic diagrams of the regions of interest at Time B according to an example embodiment.
Figure 5B:
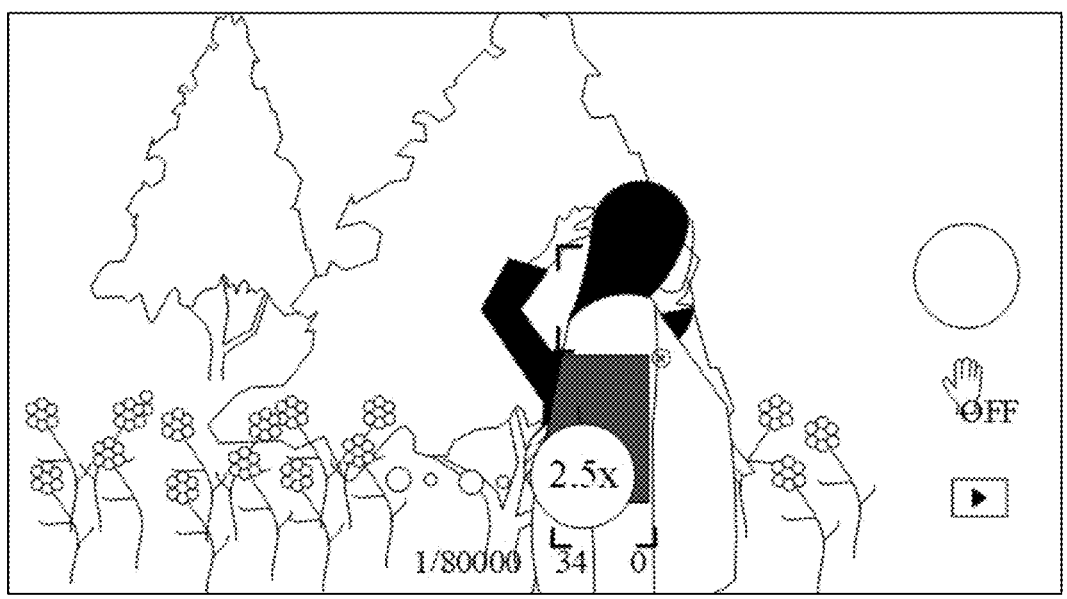
Figure 6A:
FIGS. 6A and 6B are schematic diagrams of a previously recorded video content at Time C according to an example embodiment.
Figure 6B:
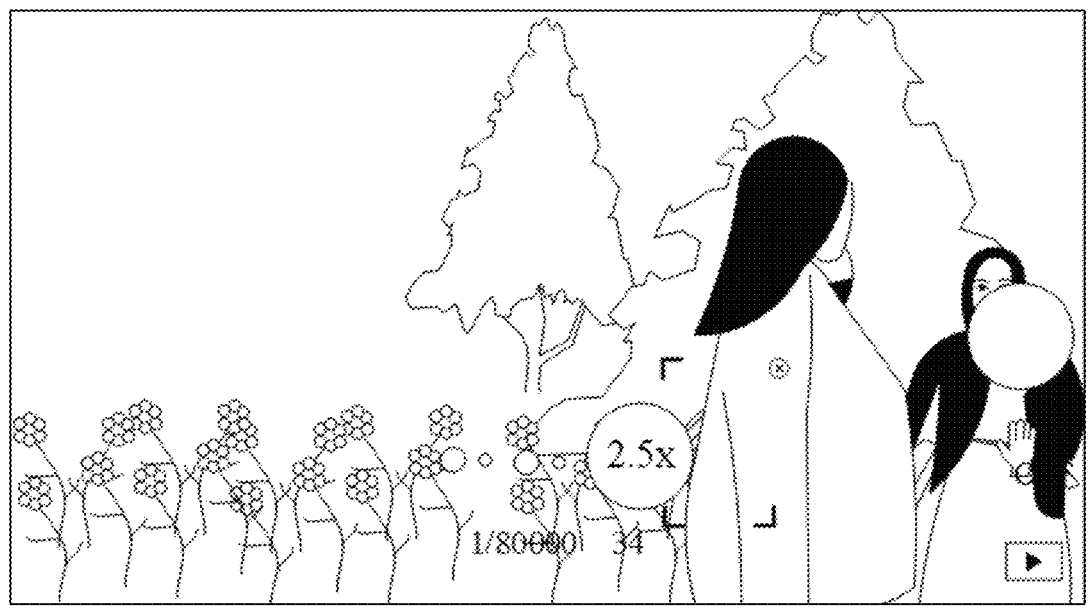
Figure 7A:
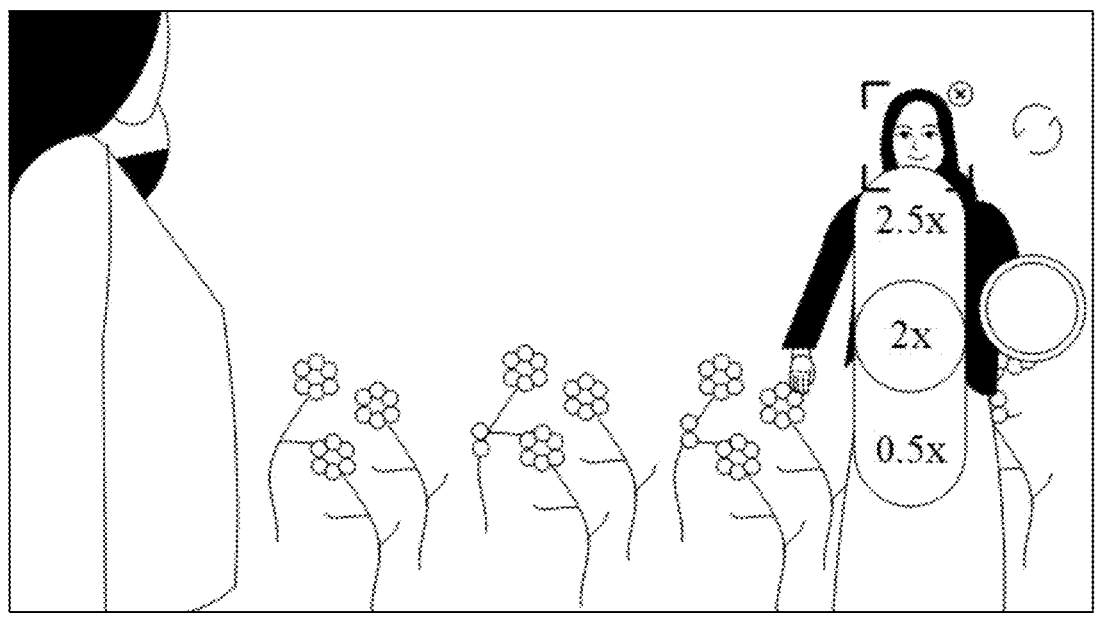
FIGS. 7A and 7B are schematic diagrams of a video content captured at Time C according to an example embodiment.
Figure 7B:
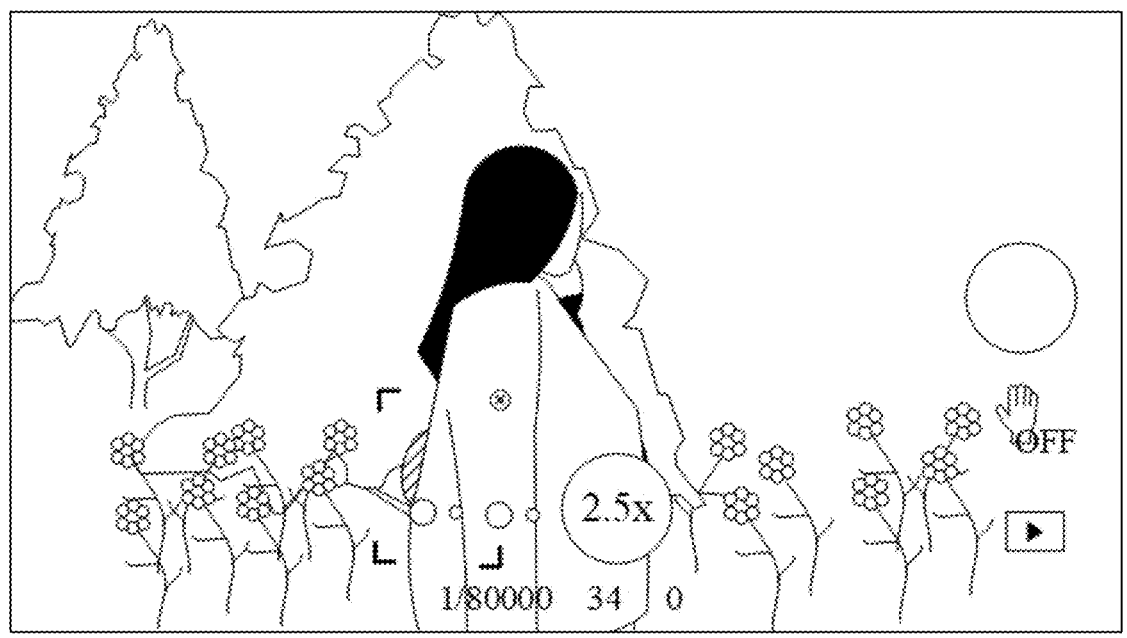
Figure 8A:
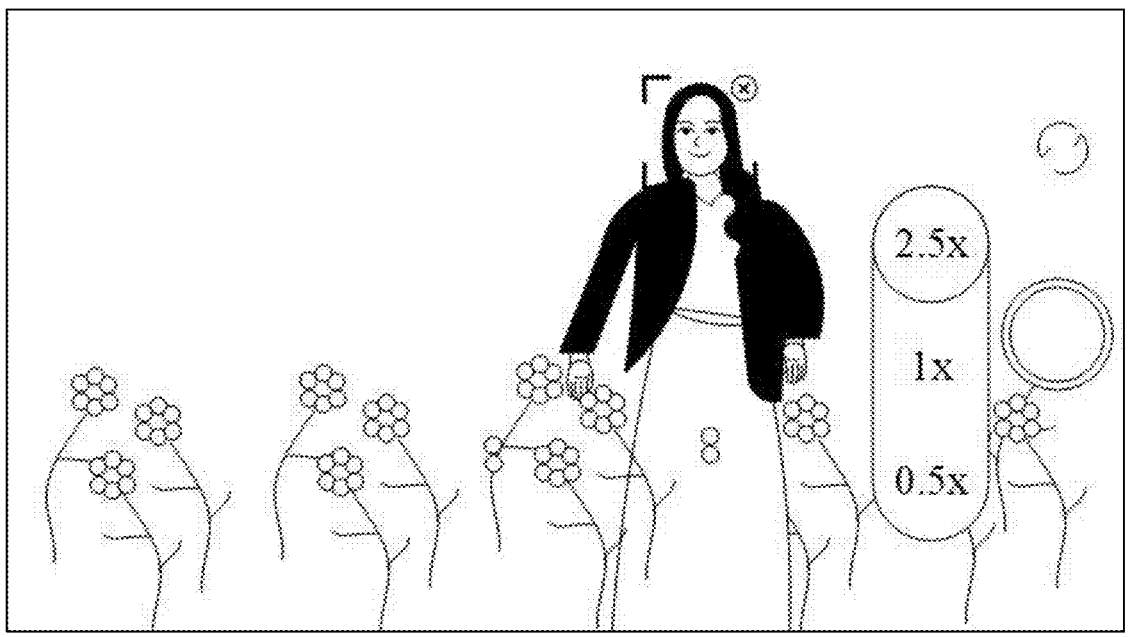
FIGS. 8A and 8B are schematic diagrams of a video content captured at Time D according to an example embodiment.
Figure 8B:
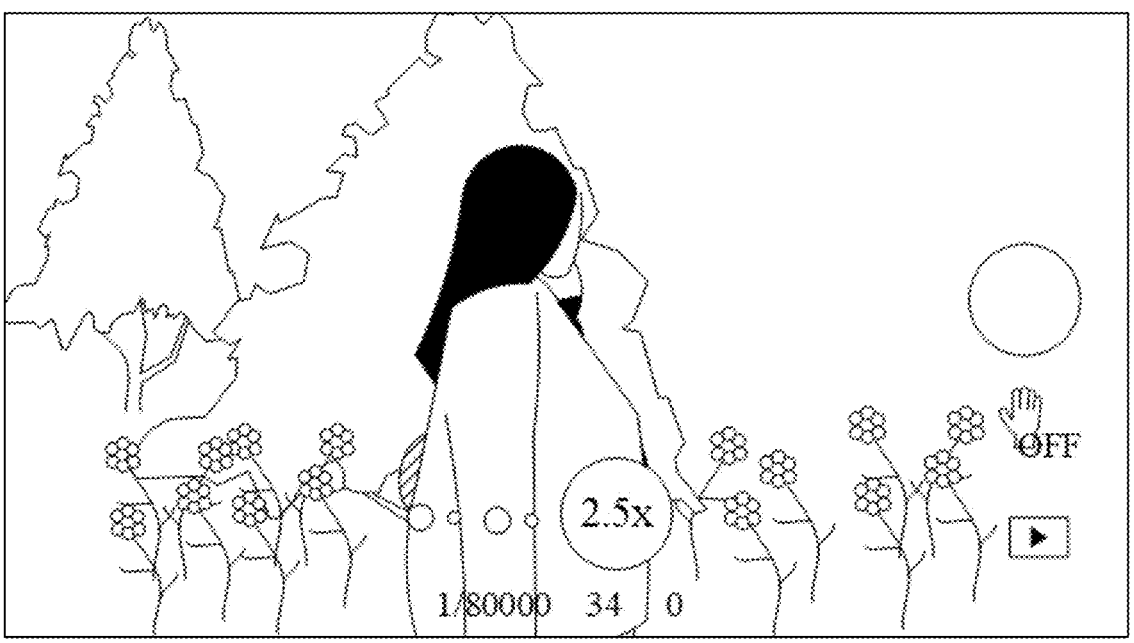
Figures 9A, 9B:
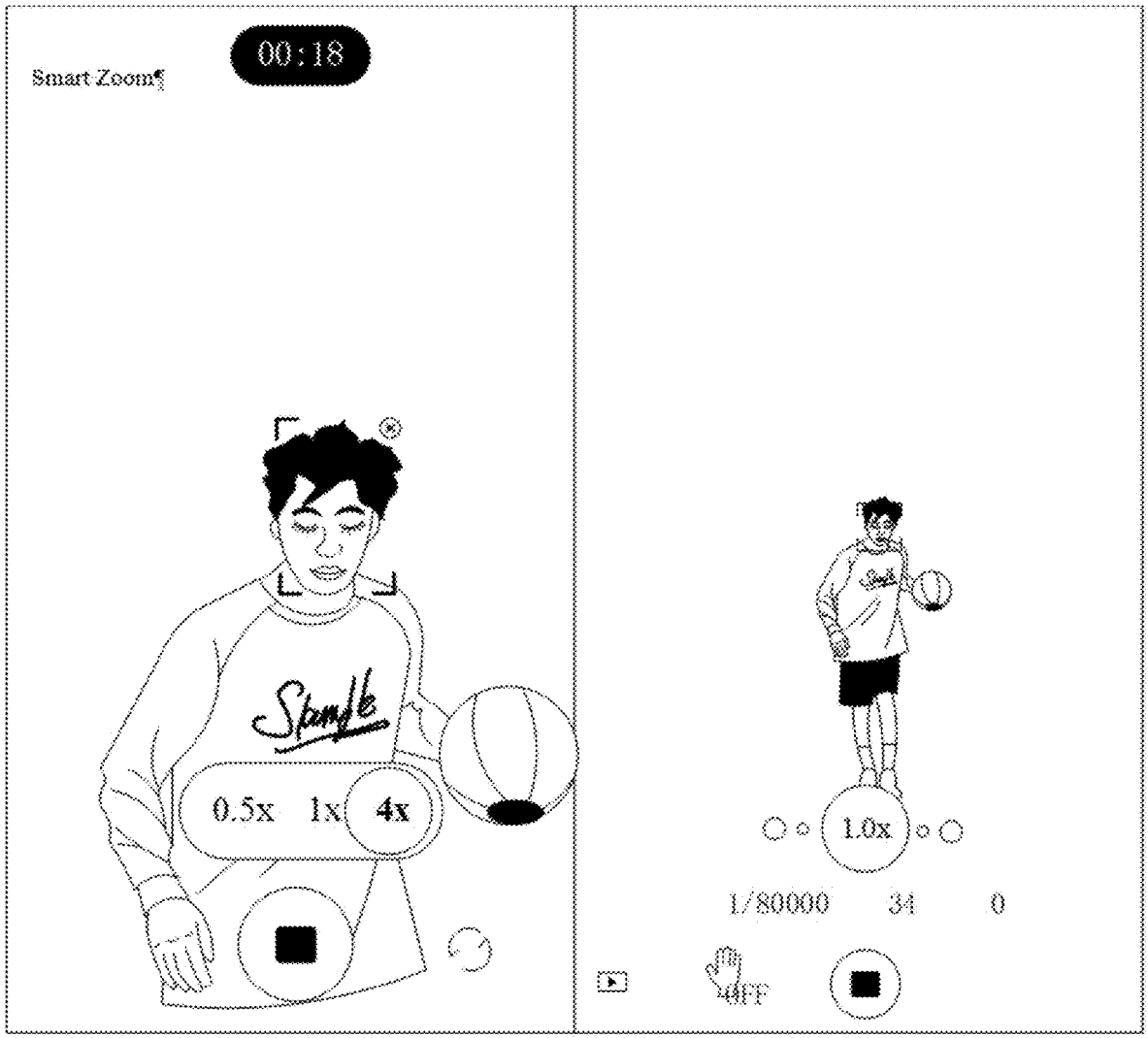
FIGS. 9A and 9B are schematic diagrams of a video content captured at Time A according to another example embodiment.
Figures 10A, 10B:
FIGS. 10A and 10B are schematic diagrams of a video content captured at Time B according to another example embodiment.

Through multi-frame video content, a comparison is made between the effect of the example embodiments and related embodiments. The video content shown in FIG. 3A through FIG. 8B are arranged chronologically according to timestamp. FIG. 3A illustrates a video content of an example embodiment, while a related video content is shown in FIG. 3B. The target object is obstructed by a blocking object, and a pending missing-object content is being captured, with the video content captured in the example embodiment as shown in FIG. 4A, and a related video content is shown in FIG. 4B. The key portion of the example embodiment is demarcated as shown in FIG. 5A, and the key portion of the related video content is demarcated as shown in FIG. 5B. In the capture of previous video content, the example embodiment is shown in FIG. 6A, while a related video content is shown in FIG. 6B. In the capture of video content awaiting identification, the example embodiment is shown in FIG. 7A, while the related video content is shown in FIG. 7B. In the capture of video content containing the reidentified object, the example embodiment is shown in FIG. 8A, while this segment simply does not exist within the related capture of video content, as the related video content is as shown in FIG. 8B.

Within the aforementioned method of capturing video, during the process of capturing video content, when missing-object content within which the target object does not exist is captured, information regarding the location of the target object is acquired from within video content captured prior to the missing object content. Because this location information is able to provide the target object's predicted direction of movement, adjustment of the recording equipment's capturing direction and obtainment of a post-adjustment recording direction may be achieved based on this information regarding the location of the target object, thereby increasing the success rate of detecting a reidentified object under conditions of complex surroundings, by decreasing the equipment's zoom factor and obtaining a post-decrease zoom factor, the field of view may be broadened, thereby increasing the rate of detection of the reidentified object. Therefore, based on the post-decrease zoom factor and/or the post-adjustment recording direction, the continued capture of video content containing a reidentified object that matches the target object may be achieved. The reidentified object replaces the original target object, and video content is captured, achieving recovery of recording and guaranteeing the stability of the video content.

In order to more clearly explain the various phases of the capture of video content contained within this example, the steps related to the generation of missing-object content will be described.

In an example embodiment, the capturing of video content may include, from within the present video content containing the target object, determining specifications for key portions of the target object, according to differences in value between the specifications of these key portions and the expected preset specifications, adjusting the zoom factor of the present video content while being recorded, thereby obtaining the next zoom factor value, and using the next zoom factor value, continuing capturing of video content containing the target object.

The present video content is at least one frame of video content containing the target object captured during the current segment prior to the missing-object content. According to an embodiment, the present video content may be a particular frame of video content, or may include multi-frame video content captured during the current segment.

Specifications for key portions are information regarding the in-frame scale or size of certain key portions of the target object. According to an embodiment, when the accuracy of characteristic identification of these key portions is relatively high, they may be used to determine regions of significance, with the breadth or area of these regions of significance considered to be specifications of key portions. According to an embodiment, the specifications of key portions may be specifications for the target object's face.

The desired preset specifications are specifications which are configured in advance, and are used to serve as reference values for the specifications of key portions of the target object. According to an embodiment, the desired preset specifications may be configured according to specifications for in-frame scales or sizes, or for other specification configurations. The desired preset specifications may be configured manually, or may also be set to default values.

Differences in value between specifications for key portions and the desired preset specifications are used to determine the extent of the discrepancy between the specifications for key portions and the desired preset specifications. These differences in value may be ratios between the specifications for key portions and the desired preset specifications.

Therefore, using these differences in value to adjust the zoom factor when recording current video content and thereby obtaining the next zoom factor value may allow the next zoom factor to bring the specifications for key portions closer to the desired preset specifications, thereby ensuring that the specifications for key portions do not change from, or trend nearer to, the desired preset specifications during the next video content captured when recording the current video content, enlarging the size of the target object within the video content and clarifying its details. Taking video conferencing as an example, and using a person's face as the key portion, the use of ratios between the specifications for the person's face and the desired preset specifications may ensure that the region containing the person's face may be contained within a reasonable field of view throughout the video conference, allowing for the person's face to appear within the content with more clarity and a larger size.

In an example embodiment, which is a combination with AI zoom, AI zoom is used to control the zoom factor of the content, allowing for the specifications of key portions of the target object (a person's face) to remain relatively stable throughout the course of recording.

AI zoom process includes process of parameter configuration. A rectangular target box defining the desired preset specifications for the key portions of the object is configured, with potential desired preset specifications being the height of a person's face as a ratio of the height of the frame, a ratio of the width, or a ratio of the area. These values may be preset by the system, or may also be adjusted by the user, for example, when using flow, the desired preset specifications are the preset values within the app.

AI zoom process includes an adjustment process. The adjustment process may include capturing video content based on the location of the target object, detecting and acquiring specifications for the rectangular box within every frame of content, with specifications that include, but are not limited to, heights, widths, areas, and square roots of areas. Then, the difference in size between the specifications for the person's head and the desired preset specifications is calculated and obtained, a process through which the difference between the current size of the rectangular target box and the desired size may be calculated. Then, the recording equipment's zoom factor is adjusted according to the aforementioned size discrepancy. As an example, when the current size of the rectangular target box is larger than the desired size, then the zoom factor is decreased, when the current size of the rectangular target box is smaller than the desired size, then the zoom factor is increased. Proportion control methods (such as a PID controller) may be used to adjust the zoom factor, thereby achieving a smooth adjustment process. Then, the zoom is updated, and the content zoom is updated according to the post-adjustment zoom factor. The adjustment process may be executed in a cyclical manner until missing-object content is captured.

Through this algorithmic flow, the target may be maintained at a relatively stable size within the frame by controlling the zoom factor during the process of capturing video content. This is extremely useful in cases of long-distance tracking, as it may allow the system to automatically switch to a larger zoom factor as represented by a telephoto lens, enlarging the size of the target object within the frame and increasing the clarity of its detail.

In an example embodiment, shown in FIG. 9 through FIG. 12, the differences between the example embodiments and related embodiments are described, and include, in chronological order based on timestamp, Time A, Time B, Time C, and Time D. At Time A, the recording equipment's zoom factor in the example embodiment is 4×, with the video content as shown in FIG. 9A, while the recording equipment's zoom factor using related embodiment is 1×, with the related video content as shown in FIG. 9B. At Time B, the example embodiment uses the next zoom factor based on the specifications of the person's face at Time A to capture video content of the target object, obtaining the video content as shown in FIG. 10A, with the recording equipment's zoom factor increased to 5.3×, while the recording equipment's zoom factor using related embodiment is 1×, with the related video content as shown in FIG. 10B.

Figures 11A, 11B:
FIGS. 11A and 11B are schematic diagrams of a video content captured at Time C according to another example embodiment.
Figures 12A, 12B:
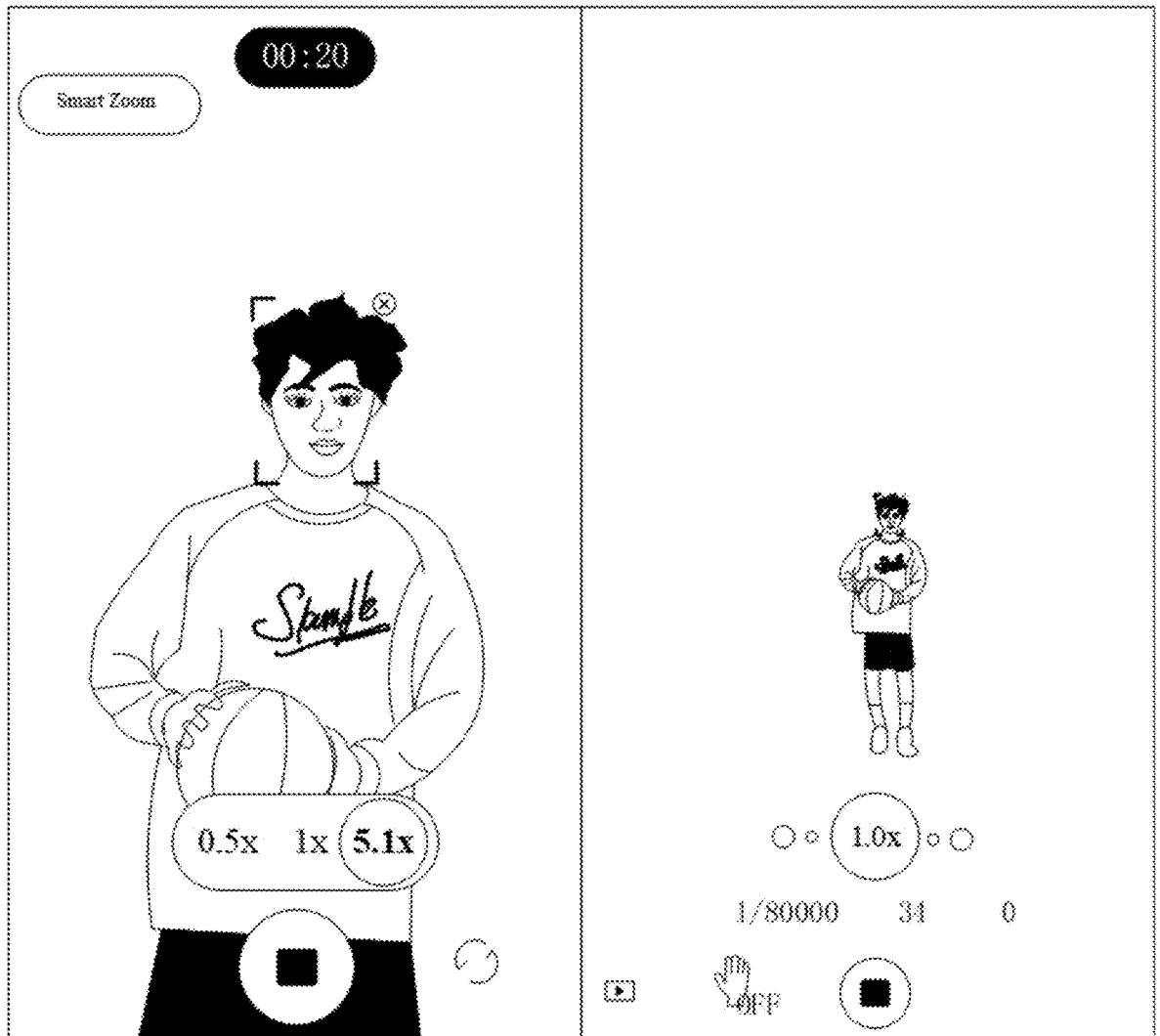
FIGS. 12A and 12B are schematic diagrams of a video content captured at Time D according to another example embodiment.

At Time C, the recording equipment's zoom factor in the example embodiment is 5.1×, with the target object located at the left boundary of the frame, with the video content as shown in FIG. 11A, while the recording equipment's zoom factor using related embodiment is 1×, with the related video content as shown in FIG. 11B. At Time D, the example embodiment uses the location information at Time C to adjust the recording equipment's direction of capture, capturing video content with the post-adjustment recording direction as shown in FIG. 12A, with the higher zoom factor of 5.1×, while the recording equipment's zoom factor using related embodiment is 1×, with the related video content as shown in FIG. 12B.

In an example embodiment, missing-object content in which the target object does not exist may include acquisition of reference characteristics for the target object; from within the captured video content, extracting characteristics of candidate objects and obtaining candidate object characteristics, determining the level of similarity between the characteristics of candidate objects and the reference characteristics, within each segment of video content, determining the level of similarity that satisfies the missing object requirements for the corresponding missing-object content.

According to an embodiment, the reference characteristics of the target object may be all of the characteristics extracted for a particular target object. These reference characteristics may be extracted from regions of interest in which the target object is located within the current video content or within other captured video content containing the same target object. According to an embodiment, when viewed from a data perspective, the reference characteristics may be reference templates or reference eigenvectors. These reference eigenvectors may be extracted based on the rectangular box when the target is initialized, or may also be updated dynamically during the process of capturing video content of the target object, with the conditions for such updates being that the target object is not in a missing state, in that missing-object content without the target object is being captured. This dynamic updating method may be set as scheduled updates, and may be set to update after a certain number of frames.

The characteristics of candidate objects are the characteristics extracted during the candidate object identification process, where each frame of captured video content has its own individual candidate object characteristics. The level of similarity between the characteristics of candidate objects and the reference characteristics can be used to judge whether or not candidate objects can be reidentified objects. As an example, when the characteristics of candidate objects and the reference characteristics are all eigenvectors, techniques for comparing the level of similarity between the candidate object characteristic eigenvectors and the reference characteristic eigenvectors may be used.

Missing-object criteria are used to judge whether or not a level of similarity represents that the target object is missing from the video content. Missing-object criteria may be a level of similarity lower than the preset value, preset ratio, or other similarity comparison result, and missing-object criteria may also be determined based on the number of consecutive frames within pending missing-object content from which the target object is missing, thereby further increasing accuracy.

In an example embodiment, the calculation method for levels of similarity may be based on template matching or feature point matching methods, and similarity level calculations may be made using a collection of characteristics from candidate objects and preset templates or feature points, The calculation method may also employ deep learning models such as, for example, Siamese networks, ReID networks, etc. to extract characteristics from candidate objects, and then calculate similarity levels between the characteristics of target objects and reference characteristics, with commonly seen methods including cosine similarity and Euclidean distance. When the level of similarity is below a set threshold, or, when the distance between eigenvectors is above a set threshold, the target object is considered to be missing or to have left the field of view, resulting in the capture of missing-object content.

Because the process of capturing missing-object content involves the extraction of the target object's reference characteristics, such reference characteristics may be dynamically adjusted based on a dynamically changing target object, leading to dynamic adjustment of the level of similarity between the characteristics of the candidate object and the reference characteristics, improving the accuracy of identifying missing-object content and thereby leading to more stability in the reidentification of objects from within identified candidate objects.

In another example embodiment, the capture of missing-object content in which the target object does not exist may include within the multi-frame video content currently being recorded, performing a count of the number of consecutive frames within the pending missing-object content from which the target object is missing, and obtaining a consecutive missing-object frame count. When this consecutive missing-object frame count satisfies the requirement for missing-object content, then missing-object content exists within the multi-frame video content currently being recorded.

Pending missing-object content is video content in which the target object doesn't exist. The consecutive missing-object frame count is the number of consecutive video frames within the pending missing-object content from within the current video recording, and it is used to more accurately determine whether or not the target object is in a state of temporary obstruction or another state, such that an accurate determination may be made as to whether or not missing-object content has been captured.

In an example embodiment, within the multi-frame video content currently being recorded, performing a count of the number of consecutive frames within the pending missing-object content from which the target object is missing, and obtaining a consecutive missing-object frame count may include, from the multi-frame video content shot within 1 second of the current time, determining pending missing-object content in which the target object does not exist based on levels of similarity or on the connectedness between movements, and obtaining the consecutive missing-object frame count from the number of video frames counted within the pending missing-object content.

As an example, in order to avoid having the target object enter into a state of temporary obstruction, or, errors in determination caused by abnormal movement of the target object, a consecutive missing-object frame counter may be configured. The target will only be considered truly missing when multiple consecutive frames all detect that the target is missing or has left the field of view.

Under conditions wherein the consecutive missing-object frame count satisfies the missing-object criteria, missing-object content may be more accurately determined from within multi-frame video content within the current recording, and under conditions of missing-object content, information regarding the location of the target object may be acquired from within the video content captured prior to the missing-object content.

After describing the steps related to the appearance of missing-object content, the process of determining the post-adjustment recording direction will be described.

In an example embodiment, the acquisition of information regarding the location of the target object from within video content captured prior to the missing-object content may include determining which previously recorded video content from within the current recording of video content contains the target object; identifying regions at the boundary of the frame in which the target object is located within the previously recorded video content.

When the boundary regions of the frame use the captured video content as a reference object, the movement trends of the target object are determined relative to the terminal. When the target object is located at a boundary region of the frame, the movement trends of the target object are at the very least a representation of the expected direction of motion as indicated by that boundary region of the frame, and the movement velocity of the target object may be reflected by the previously captured multi-frame video content. According to an embodiment, the boundary regions of the frame may belong to the left side boundary or the right side boundary of the video content.

In an example embodiment, the determination of previously captured content containing the target object within the video content captured during the current recording may include from within the video content captured during the current recording, based on the timestamp at which the missing-object content appears, previously captured video content containing the target object is sought, captured video content includes previously captured video content containing the target object, and may also include pending missing-object content in which the target object does not exist.

In an example embodiment, identifying the boundary region of the frame in which the target object is located from within the previously captured video content may include identifying regions of interest in which the target object is located from within the previously captured video content, based on the coordinate locations of these regions of interest, determining the boundary region of the frame in which the target object is located.

Determining the previously captured video content containing the target object is achieved by predicting the movement trends of the target object within a dynamically changing time period, thereby accurately determining in which boundary regions of the frame the target object is located, with each boundary region of the frame having its own movement trends.

In an example embodiment, based on the information regarding the location of the target object, adjusting the recording equipment's capturing direction may include, when the target object is located at the left boundary of the frame in previously recorded video content, the recording equipment's capturing direction is adjusted based on the location of the left boundary. When the target object is located at the right boundary of the frame in previously recorded video content, the equipment's recording direction is adjusted based on the location of the right boundary.

The location of the left boundary is used by the terminal to adjust the recording equipment's capturing direction to the left side. The location of the right boundary is used by the terminal to adjust the recording equipment's capturing direction to the right side.

In an example embodiment, when the target object is located at the left boundary of the frame in previously recorded video content, adjusting the recording equipment's capturing direction based on the location of the left boundary may include, when the boundary region of the frame in which the target object is located is consistent with the coordinates or level of similarity of the location of the left boundary, the recording equipment's capturing direction is adjusted toward the left side of the terminal.

When the target object is located at the right boundary of the frame in previously recorded video content, then adjusting the recording equipment's capturing direction based on the location of the right boundary may include, when the boundary region of the frame in which the target object is located is consistent with the coordinates or level of similarity of the location of the right boundary, the recording equipment's capturing direction is adjusted toward the right side of the terminal.

Therefore, using a type of boundary location region between the location of the left boundary of the frame and the location of the right boundary of the frame within the previously captured video content in order to adjust the recording equipment's capturing direction may allow for the post-adjustment recording direction to align with a greater number of predicted movement directions.

According to the example embodiment after describing the post-adjustment recording direction, the process of adjusting the recording equipment's zoom factor will be described, as this adjustment process involves lowering the recording equipment's zoom factor in order to increase the field of view, and also involves the recovery of the recording equipment's zoom factor, in order to match the field of view with that of the missing-object content.

In an example embodiment, a predicted direction of movement for the target object is estimated based on the final known location of the target object from captured missing-object content. For example, when an object is located at the left or right boundary of the frame prior to disappearing, the gimbal will rotate toward the left or right, and the gimbal's drive signal will extend for a short period of time (0.5 seconds) following the disappearance to allow the gimbal to continue moving in the direction to which the target disappeared, making it easier to find and track the target.

In an example embodiment, when the target object is obstructed by another object or when the target object quickly moves away from the field of view, the expected direction and velocity of the target object's movement relative to the background is analyzed based on multi-frame video content captured prior to the missing-object content. In particular, within each frame of video content, the motion vector for each pixel is calculated based on the dense optical flow method. The target motion vector is determined based on the average or median value of the optical flow vector of the pixels within the target object. The background motion vector is determined based on the average or extracted median value of the optical flow vector of the pixels outside of the target object. The expected direction and velocity of the target object's movement relative to the background is determined based on the difference in value between the target motion vector and the background motion vector. A more accurate estimate may be obtained by averaging several frames of motion vectors prior to the missing-object content. After the object has gone missing, 0.5 to 1 seconds of rotation may be used according to the current estimated direction and velocity of the target in order to assist in finding the target.

In an example embodiment, decreasing the recording equipment's zoom factor and obtaining a post-decrease zoom factor may include, within the range of values between the zoom factor when recording the missing-object content and the preset zoom factor, gradually decreasing the recording equipment's zoom factor and obtaining a gradually decreased equipment zoom factor. This gradually decreased equipment zoom factor may be the post-decrease zoom factor.

The preset zoom factor may be the equipment's smallest zoom factor, and may also be a dynamically adjusted zoom factor based on certain algorithms. Within the range of values between the zoom factor when recording the missing-object content and the preset zoom factor, adjusting the recording equipment's zoom factor may allow for relatively small changes in the field of view captured through the lens by the terminal, and relatively high efficiency.

The gradually decreased equipment zoom factor may allow for a relatively stable increase in the field of view involved with the terminal's recording, thereby gradually and steadily increasing the rate at which the reidentified target is identified when the target object is obstructed by another object or the target object moves relatively quickly.

In an example embodiment, the camera may be gradually switched to the smallest zoom ratio supported by a phone, at a rate of a 2× decrease per second. For example, when the recording equipment's zoom factor at a particular time is 4.5×, and the smallest zoom ratio supported by the camera is 0.5× (for an ultra wide-angle lens), then the zoom factor would be 4.5× at the start of the switch, 2.5× after 1 second (=4.5−2*1), and 0.5× after 2 seconds (=4.5−2*2); if the current zoom factor is 3×, and the smallest zoom ratio supported by the camera is 1× (for a primary camera lens), then the zoom factor would be 3× at the start of the switch, 2× after 0.5 seconds (=3−2*0.5), and 1× after 1 second (=3−2*1).

In an example embodiment, the recording equipment's zoom factor is decreased based on the size specifications of the target object, in order to make the ratio of the target object within the video content smaller than the value of the preset ratio. According to an embodiment, decreasing the recording equipment's zoom factor to obtain the post-decrease zoom factor may include determining the total number of pixels within the video content based on the area of the screen, calculating the maximum size of the target object within the video content based on the total number of pixels and the value of the preset ratio; determining the number of pixels within the target object based on the size of the target object within the previously captured video content, determining the scaling ratio between the number of pixels within the target object and the total number of pixels, based on this scaling ratio, scaling the zoom factor of the missing-object content while recording, and obtaining the post-decrease zoom factor. When this scaling ratio is smaller than the system's minimum zoom factor, then the smallest zoom factor supported by the system is used. Therefore, determining the scaling ratio of the recording equipment's zoom factor using the value of the preset ratio may decrease the value range of the recording equipment's zoom factor, thereby increasing accuracy.

As an example, when the aforementioned ratio value is 4%, then the area of the screen=1920*1080=2,073,600 pixels. The maximum permitted object size is calculated: maximum object size=screen area*4%=2,073,600*0.04=82,944 pixels; if the size of the target object within the previously captured content is 480×270 pixels (width× height), then the number of pixels within the target object is calculated as: number of pixels within the target object=480×270=129,600 pixels. Next, the scaling ratio is calculated: scaling ratio=sqrt(maximum object size/current object size)=sqrt(82,944/129,600)≈0.8. Assuming that the recording equipment's current zoom factor is 1×, then scaling of 0.8× is needed to meet requirements.

Since the video picture is being collected constantly, the video is continuous when sliding from the minimum zoom factor to the maximum zoom factor, and the video stream will not be interrupted, thus seamless switching between the two lenses may be achieved.

In an example embodiment, the aforementioned preset ratio value increases sequentially according to various time segments, with multiple levels of preset ratio values existing. For example, after capturing missing-object content, the aforementioned preset ratio value setting is at the first level—8%—and this state is maintained for 1 second. When tracking of the target is not recovered within this 1 second, the zoom factor will continue to be adjusted, and the aforementioned preset ratio value setting is at the first level—4%—and this process continues as such.

In another example embodiment, another rule for multi-layer zoom is described. Within the current recording after missing-object content has been captured, the recording equipment's zoom factor is scaled according to the preset ratio value, and a post-decrease zoom factor is obtained. When there is still no video content within the current recording time segment in which the reidentified object exists, then the recording equipment's zoom factor is decreased according to the preset ratio value, a post-decrease zoom factor is obtained, and this process continues as such. Here, the preset ratio value may be 0.6×.

In an example embodiment, the camera used by the terminal involves multiple lenses with a corresponding variety in their ranges of zoom factor, based on the video content awaiting identification that is captured with the post-decrease zoom factor and/or post-adjustment recording direction, the continued capture of video content containing a reidentified object that matches the target object may include, when the post-decrease zoom factor belongs within a range of values that requires the lens be switched, then the lens is switched, during the lens switching process, capture of video content is stopped until the lens switch is completed, controlling such that the post-switch lens captures the video content awaiting reidentification, continued capture of video content containing the reidentified object is achieved based on the identification of a reidentified object matching the target object within the video content awaiting identification.

The range of values that requires the lens be switched is the range of preset zoom factors within the lens-switching state. According to an embodiment, the range of values that requires the lens be switched may be multiple zoom factors, and may also be a range of zoom factors. According to an embodiment, when a zoom factor switching point exists between an ultra wide-angle lens and a wide-angle lens, the zoom factor switching point belongs to the range of values that requires the lens be switched; when a zoom factor focal length switch exists between an ultra wide-angle lens and a wide-angle lens, the range of focal length switch belongs to the range of values that requires the lens be switched. According to an embodiment, during the process of recording in the post-adjustment recording direction, the lens switching process may be performed simultaneously.

In an example embodiment, when the post-decrease zoom factor belongs to the range of values that requires the lens be switched, the lens is switched, including, when the post-decrease zoom factor lies within the range of focal lengths that require the lens be switched between a wide-angle lens and a telephoto lens, the terminal's camera is controlled to switch from a telephoto lens to a wide-angle lens.

During the process of switching the lens, capture of video content is stopped until the switching of lenses is complete, and the control of the lens after the switch is completed in order to capture video content awaiting identification includes: during the process of switching from a telephoto lens to a wide-angle lens, capture of video content is stopped until the terminal's lens has switched to a wide-angle lens, and this wide-angle lens is used to capture the video content awaiting identification.

Because the post-decrease zoom factor is decreased gradually, when the post-decrease zoom factor belongs to different ranges of values that require the lens be switched, the zoom factors within the range of values that require the lens be switched for each lens separately control the terminal to stop the capture of video content, in order to prevent video content from being captured during the process of switching between different lenses, which may produce identification errors in the reidentified object, as this increase the accuracy of the identification and thereby results in more accurate capture of video content containing the reidentified object.

In an example embodiment, the camera used by the terminal may include multiple lenses that correspond to different ranges of zoom factors, before capturing video content of the reidentified object, this process also may include controlling for a gradual increase of the post-decrease zoom factor, obtaining a post-increase zoom factor. When the post-increase zoom factor belongs to the range of values that require the lens be switched, then the lens is switched, and the post-increase zoom factor continues to be increased until reaching the zoom factor that was used when recording the missing-object content.

In an example embodiment, controlling the gradual increase of the post-decrease zoom factor to obtain the post-increase zoom factor may include gradually increasing the recording equipment's zoom factor within the range of values that lie between the zoom factor that was used when recording the missing-object content and the preset zoom factor, thereby obtaining a gradually increased equipment zoom factor;

When the post-increase zoom factor belongs to the range of values that require the lens be switched, then the lens is switched, including: when the gradually increased equipment zoom factor is a certain focal length that belongs to the range of values that require the lens be switched, then the lens is switched.

In another example embodiment, controlling a gradual increase of the post-decrease zoom factor in order to obtain a post-increase zoom factor may include, when the post-decrease zoom factor requires a switch in focal length and lies between a wide-angle lens and a telephoto lens, the terminal's lens is controlled to switch from a wide-angle lens to a telephoto lens.

When the gradually increased equipment zoom factor is a certain focal length that belongs to the range of values that require the lens be switched, then the lens is switched, including continuing or stopping the capture of video content while in the process of switching from a wide-angle lens to a telephoto lens.

After switching the lens, the post-increase zoom factor continues to increase until reaching the zoom factor that was used when recording the missing-object content, which allows for the missing-object content and the video content capturing the reidentified object to have similar fields of view; these fields of view may be characterized through similar fields of view or other parameters, and the similar field of view may allow for greater stability in the field of view of the video content.

According to an embodiment, the aforementioned range of values that require the lens be switched may include at least one interval within the first switch in focal length and the second switch in focal length. The first switch in focal length is the range of zoom factors during the process of switching between the ultra wide-angle lens and the wide-angle lens and the second switch in focal length is the range of zoom factors during the process of switching between the wide-angle lens and the telephoto lens.

In an example embodiment, when the recording equipment's zoom factor is the post-decrease zoom factor and the zoom factor at the time the missing-object content was recorded belongs to the focal length of a telephoto lens, when making a distinction regarding the focal length of the preset zoom factor, at least two scenarios exist regarding the lens that is in place after the terminal has completed the switching process:

In the first scenario, when the preset zoom factor is a focal length that belongs to a wide-angle lens, then the post-decrease zoom factor belongs to the second switch in focal length, and the telephoto lens is switched to the wide-angle lens, indicating that the wide-angle lens is the lens in use when the switching process is complete.

According to another example embodiment, when the preset zoom factor is a focal length that belongs to an ultra wide-angle lens, then the post-decrease zoom factor belongs to the second switch in focal length, and the telephoto lens is switched to the wide-angle lens. Capturing of video content may be continued through the wide-angle lens after the switching process is complete, until the post-decrease zoom factor belongs to the first switch in focal length, and the wide-angle lens is switched to the ultra wide-angle lens. Capturing of video content may be continued through the ultra wide-angle lens after the switching process is complete.

In another example embodiment, when the recording equipment's zoom factor is the post-increase zoom factor and the zoom factor at the time the missing-object content was recorded belongs to the focal length of a telephoto lens, when making a distinction regarding the focal length of the preset zoom factor, at least two scenarios exist regarding the lens that is in place after the terminal has completed the switching process:

According to an example embodiment, when the preset zoom factor is a focal length that belongs to a wide-angle lens, then the post-decrease zoom factor belongs to the second switch in focal length, and the wide-angle lens is switched to the telephoto lens, indicating that the telephoto lens is the lens in use when the switching process is complete.

According to another example embodiment, when the preset zoom factor is a focal length that belongs to an ultra wide-angle lens, then the post-increase zoom factor belongs to the first switch in focal length, and the ultra wide-angle lens is switched to the wide-angle lens. Capturing of video content is continued through the wide-angle lens after the switching process is complete, until the post-increase zoom factor belongs to the first switch in focal length, and the wide-angle lens is switched to the telephoto lens, and capturing of video content containing the reidentified object is continued through the telephoto lens after the switching process is complete.

Therefore, following the appearance of missing-object content, recording may be continued in a larger field of view by switching the lens to a wide-angle lens or an ultra wide-angle lens, thereby increasing the probability of capturing video content awaiting identification that contains the reidentified object. During the process of capturing video content that contains the reidentified object, the overall fluctuation in the field of view of the captured video content may be made relatively small by switching the lens to a wide-angle lens or telephoto lens.

In another example embodiment, the terminal employs a digital zoom method, correspondingly, the capture of video content containing a reidentified object that matches the target object is achieved based on the post-decrease zoom factor and/or the post-adjustment recording direction, and may include enlarging the cropping scale of the true video content based on the post-decrease zoom factor, thereby obtaining a post-increase cropping scale. The true video content may be a video content captured through the lens, and/or, decreasing the content enlargement parameter of the true video content, thereby obtaining a post-decrease content enlargement parameter. Video content awaiting identification may be extracted from within the true video content based on the post-increase cropping scale and/or the post-decrease content enlargement parameter. Video content of the reidentified object may be captured based on the reidentified object matching the target object that is identified from within the video content awaiting identification.

The true video content is the video content captured through the actual lens of the terminal, the video content that is actually recorded or captured by the terminal is cropped based on the cropping scale, and the video content is obtained by enlarging the post-cropping video content based on the content enlargement parameter.

According to an embodiment, the recording equipment's zoom factor and the cropping scale are negatively correlated, and the recording equipment's zoom factor and the content enlargement parameter are negatively correlated. During the process of decreasing the recording equipment's zoom factor, the cropping factor will be correspondingly increased, and the video content awaiting identification is extracted by decreasing the content enlargement factor.

In an example embodiment, video content awaiting identification is extracted from within the true video content based on the post-increase cropping scale and the post-decrease content enlargement parameter, and may include extracting a post-increase cropping window from within the true video content, based on the post-increase cropping scale, increasing the size of the post-increase cropping window based on the post-decrease content enlargement parameter, and thereby obtaining the video content awaiting identification.

During the digital zoom process, using the post-decrease zoom factor to generate a post-increase cropping scale, using the post-increase cropping scale to broaden the field of view, using the post-decrease content enlargement parameter to maintain the video content at a moderate size, and then extracting the video content awaiting identification from within the true video content.

In an example embodiment, target tracking may be effectively recovered and tracking stability may be improved under conditions in which the target object is blocked, obstructed by another person or object, or moves quickly out of the frame. One aspect of this example embodiment is directed to its increase in the probability of rediscovering the target by decreasing the zoom factor and expanding the field of view when target tracking is lost. Another aspect of this example embodiment is directed to its increase in the success rate of reidentifying the target within complex environments by rotating the lens in search of the target. Another aspect is directed to its increase in the accuracy of target reidentification by integrating deep learning models while extracting and matching characteristics of the target.

In an example embodiment, with decreasing the zoom factor as an example, decreasing the zoom factor of a cell phone camera to half of its original value (expanding the field of view) may be achieved through optical zoom or digital zoom. The following examples, separated as scenarios that involve switching the camera's lens and scenarios that do not involve switching the camera's lens, describe the process of regulating the zoom factor:

Firstly, the optical zoom process, which involves switching the camera's lens, is described. When the user is using a cell phone recording device with three lenses (ultra wide-angle, wide-angle, and telephoto). The current zoom factor is 2× (telephoto lens), and the user wishes to decrease the zoom factor to half of its original value (1×, wide-angle lens); the specific process may include via the interface or the algorithms described in any of the aforementioned embodiments, the recording equipment's zoom factor is adjusted from 2× to 1×. The cell phone's system detects that the required range of focal lengths necessitates the switch to a wide-angle lens (1×). The cell phone's system temporarily closes the camera's lens and stops recording video during the process of switching lenses. After the cell phone's system completes the process of switching lenses, the system reactivates the camera and resumes the recording process, adjusting the focal length to 1×, allowing the user to record at the new focal length of 1×.

Next, the digital zoom process, which does not involve switching the camera's lens, is described. When the user is currently using a single-lens cell phone camera that only has a wide-angle lens. The current zoom factor is 2× (a result of the digital zoom), and the user wishes to decrease the zoom factor to half of its original value (1×, non-digital zoom). The specific process includes, via the interface or the algorithms described in any of the aforementioned example embodiments, the recording equipment's zoom factor is adjusted from 2× to 1×. The cell phone's system detects that the required range of focal lengths does not call for the use of digital zoom; during the image processing phase, the system cancels cropping and enlargement of the image, and returns to its original field of view (1× focal length), allowing the user to record at the new focal length of 1×.

Under both types of conditions, the zoom factor is decreased from its original value (2×) to 1×, and the field of view is expanded.

The above steps are details belonging to a particular example embodiment, and that an appropriate method of achieving the required zoom may be selected according to actual needs and equipment performance. The user may not be able to directly perceive this process, however the user will be able to tell that the zoom factor has decreased, and the field of view of the content has increased.

It must be understood that although the steps encompassed by the flowcharts for each of the aforementioned embodiments are displayed sequentially, as indicated by the arrows, these steps are not necessarily executed in the sequential order indicated by the arrows. Unless stated explicitly within this text, the execution of these steps has no strict sequential order, and the steps may also be executed in other sequences. Furthermore, at least some of the steps encompassed by the flowcharts for each of the aforementioned embodiments may include multiple steps or multiple stages, and these steps or stages are not necessarily executed and completed at the same time, but rather may be executed at various times, and the execution of at least some of these steps or stages does not necessarily need to be completed in sequential order, but rather may be executed in rotation with or as an alternative to other steps or stages.

An example embodiment also provides an apparatus for capturing video, that is used to achieve the aforementioned steps and method of capturing video. The solution plan provided by the apparatus is similar to the implementations described in the aforementioned methods, and as such the particular qualities found within one or multiple of the example embodiments for this apparatus for capturing video refer to the qualities in the above text for the method of capturing video, and are not repeated here.

Figure 13:
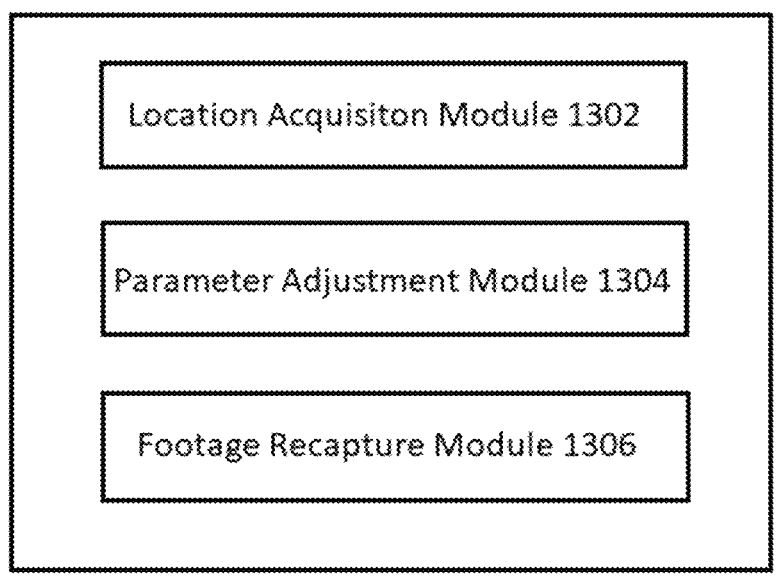
FIG. 13 is a block diagram of an apparatus for capturing video according to an example embodiment.

In an example embodiment, as shown in FIG. 13, an apparatus for capturing video may include a location acquisition module (1302), used during the process of capturing video content, when capturing missing-object content in which the target object does not exist, to acquire information regarding the location of the target object from within video content captured prior to the missing-object content. The timestamp of the previously captured video content is earlier than the timestamp of the missing-object content.

The apparatus also includes a parameter adjustment module (1304), used to adjust the recording equipment's capturing direction based on the information regarding the location of the target object, and thereby obtain a post-adjustment recording direction, and/or used to decrease the recording equipment's zoom factor, and thereby obtain a post-decrease zoom factor.

The apparatus also includes a content recapture module (1306), used to capture video content containing a reidentified object that matches the target object based on the post-decrease zoom factor and/or the post-adjustment recording direction.

In an example embodiment, the location acquisition module (1302) is used to determine the specifications of key portions of the target object from within current video content that contains the target object, to adjust the zoom factor of the video content that is currently being recorded and obtain the next zoom factor based on the discrepancy in value between the specification of the key portions and the desired preset specifications, and to capture video content of the target object using the next zoom factor.

In example embodiment, the location acquisition module (1302) is used to acquire reference characteristics from the target object, to extract characteristics of candidate objects and obtain characteristics of candidate objects while capturing video content, to determine the level of similarity between the characteristics of candidate objects and the reference characteristics, and to determine which missing-object content from within the captured content has levels of similarity that satisfy the missing-object criteria.

In an example embodiment, the location acquisition module (1302) is used within multi-frame video content captured during the current recording, to calculate the number of consecutive frames from which the target object is missing within pending missing-object content and obtain a consecutive missing-object frame count.

When the missing-object frame count satisfies the missing-object criteria, then missing-object content exists within the multi-frame video content captured during the current recording.

In an example embodiment, the location acquisition module (1302) is used to determine which previously captured video content, from within the video content captured during the current recording, contains the target object, and to identify in which region at the boundary of the frame the target object is located, from within the previously captured video content.

In an example embodiment, the parameter adjustment module (1304) is used when the target object is located at the left boundary of the frame within the previously captured video content, to adjust the recording equipment's capturing direction based on the location of the left boundary.

When the target object is located at the right boundary of the frame within the previously captured video content, to adjust the recording equipment's capturing direction based on the location of the right boundary.

In an example embodiment, the parameter adjustment module (1304) is used to gradually decrease the recording equipment's zoom factor and obtain a gradually decreased equipment zoom factor within the range of values between the zoom factor of the video content captured during the current recording and the preset zoom factor, where the gradually decreased zoom equipment zoom factor is the post-decrease zoom factor.

In an example embodiment, the content recapture module (1306) is used when the post-decrease zoom factor belongs to the range of values that require the lens be switched, to switch the lens during the process of switching the lens, to stop capture of video content until the process of switching the lens is complete, and to then control the switched lens in capturing video content awaiting identification, and to capture video content of the reidentified object based on the reidentified object matching the target object that was identified from within the video content awaiting identification.

In an example embodiment, the content recapture module (1306) is used to control the gradual increase of the post-decrease zoom factor and obtain a post-increase zoom factor. When the post-increase zoom factor belongs to the range of values that require the lens be switched, to switch the lens, to continue increasing the post-increase zoom factor until reaching the zoom factor that was used when recording the missing-object content.

In an example embodiment, the range of values that require the lens be switched may include at least one interval between the first switch in focal length and the second switch in focal length, the first switch in focal length is the range of zoom factors while switching between the ultra wide-angle lens and the wide-angle lens, the second switch in focal length is the range of zoom factors while switching between the wide-angle lens and the telephoto lens.

In an example embodiment, the content recapture module (1306) is used to increase the cropping scale of the true video content and obtain the post-increase cropping scale based on the post-decrease zoom factor, the true video content being the video content captured through the lens, and/or, to decrease the content enlargement parameter of the true video content and obtain a post-decrease content enlargement parameter, to extract video content awaiting identification from within the true video content, based on the post-increase cropping scale and/or the post-decrease content enlargement parameter, and to capture video content containing the reidentified object based on the reidentified object matching the target object that was identified from within the video content awaiting identification.

Each module within the aforementioned apparatus for capturing video may fully or partially realized by software, hardware, or a combination of both. The aforementioned modules may be embedded within hardware or independent of the processor within the computational equipment, and may also be stored in the form of software in the memory of computational equipment, to facilitate the processor to execute the operations that correspond to each of the modules.

Figure 14:
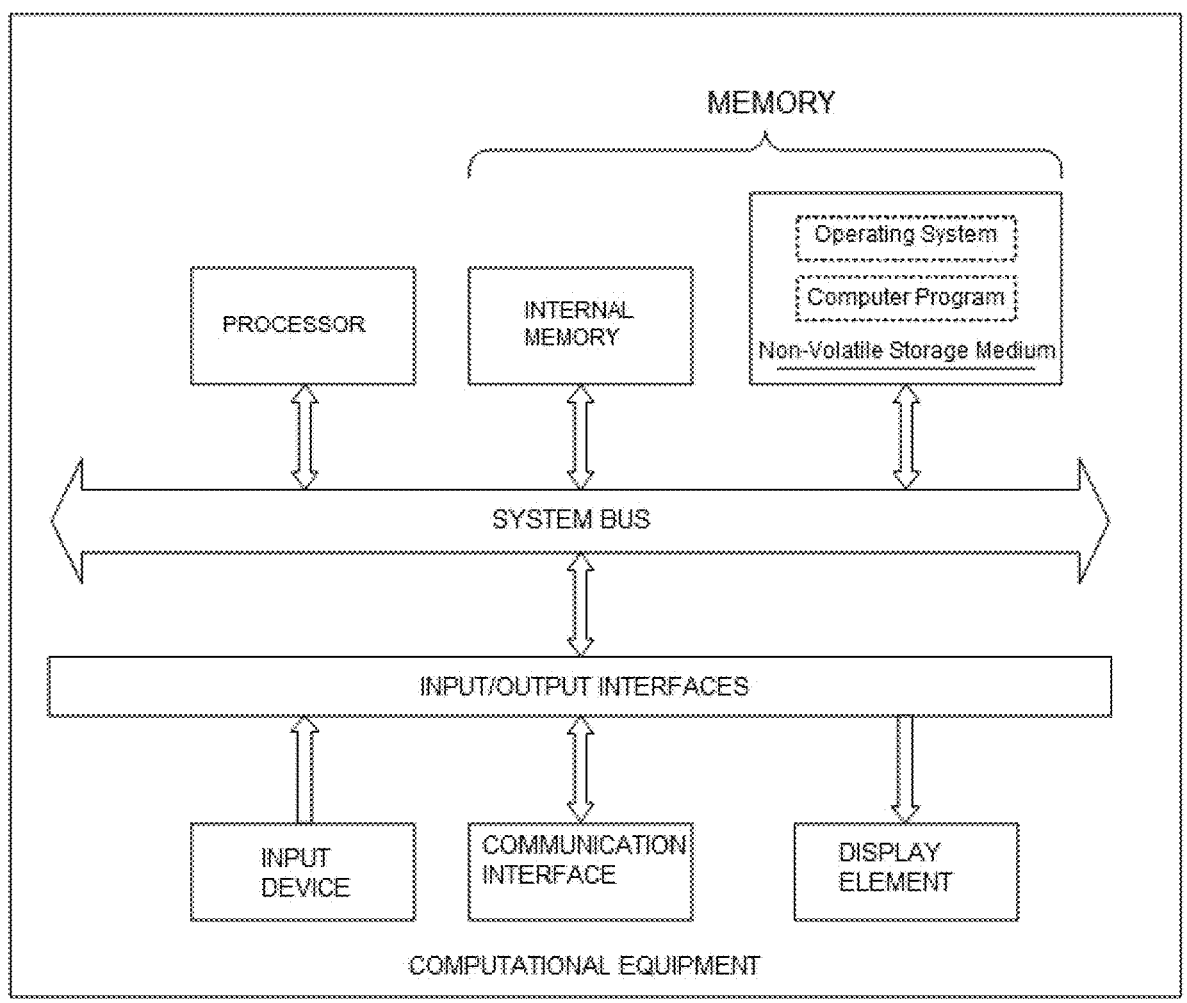
FIG. 14 illustrates a diagram of internal structure of the computational equipment according to an example embodiment.

In an example embodiment, computational equipment is provided, and this computational equipment may be a terminal with an internal structure as shown in FIG. 14. The computational equipment may include a processor, memory, input/output interfaces, a communication interface, a display element, and input device. The processor, memory, and input/output interface use the system bus connection, while the communication interface, display element, and input devices are connected to the system bus through input/output interfaces. The computational equipment's processor is used to provide computing and controlling capabilities. The computational equipment's memory includes a non-volatile storage medium and internal memory. The non-volatile storage medium stores the operating system and computer programs. The internal memory provides an environment for the operating system and computer programs of the non-volatile storage medium. The computational equipment's input/output interfaces are used to transfer information between the processor and external devices. The computational equipment's communication interface is used to communicate with external terminals via wired or wireless methods, where wireless methods may be achieved through Wi-Fi, mobile cellular networks, near-field communication (NFC), or other technologies. The computer programs realize a method for capturing video when executed by the processor. The computational equipment's display element is used to form a visual image, which may be a display screen, projection device, or virtual reality imaging device; the display screen may be a liquid crystal display screen or an E Ink display screen. The computational equipment's input devices may be a touch screen layer that covers the display screen, and may also be a key, trackball, or trackpad installed on the outer shell of the computational equipment, or an external keyboard, trackpad, mouse, etc.

FIG. 14 is merely a block diagram of the partial structure, and does not constitute any restriction of the computational equipment to which embodiments may be applied. The particular computational equipment may include more or fewer components than what is shown in FIG. 14, and may combine certain components or arrange them differently.

An example embodiment may also include a handheld gimbal, which includes, for example, motors and a processor, with the motors used to control the gimbal's rotation according to the post-adjustment recording direction, and the processor used to execute the computer programs and realize the steps of the methods in the aforementioned embodiments.

In an example embodiment, computational equipment may also be provided, including memory and a processor, with a computer program stored within the memory, and the processor used to execute the computer program and realize the steps of the methods in the aforementioned embodiments.

In an example embodiment, a computer-readable storage medium may be provided, on which is stored a computer program that is executed by a processor to realize the steps of the methods in the aforementioned example embodiments.

In an example embodiment, a computer program is provided, including a computer program that is executed by a processor to realize the steps of the methods in the aforementioned example embodiments.

All user information including, but not limited to, information about the user's device, the user's personal information, etc. and data including, but not limited to, data used for analysis, stored data, displayed data, etc. are fully authorized by the user or have undergone full authorizations by all parties, and that the collection, use, and processing of related data comply with the relevant national and local laws, regulations, and standards.

Performing the procedures within the aforementioned example embodiments in part or in full may be completed by instructing the relevant hardware through execution of a computer program, where this computer program may be stored in a non-volatile, computer-readable storage medium, and may include the procedures described within the aforementioned embodiments when executed. Any reference to memory, databases, or other mediums used within the embodiments provided by this patent may include at least one of non-volatile memory and volatile memory. Non-volatile memory may include read-only memory (ROM), tape, floppy disk, flash drive, optical memory, high-density embedded non-volatile memory, resistive memory (ReRAM), magnetoresistive random access memory (MRAM), ferroelectric random access memory (FRAM), phase change memory (PCM), graphene memory, etc. Volatile memory may include random access memory (RAM), eternal cache memory, etc. Serving as an illustration, rather than a limitation, RAM may come in multiple forms, such as static random access memory (SRAM) or dynamic random access memory (DRAM), etc. The databases involved with each of the embodiments provided in this patent may include at least one type out of relational and non-relational databases. Non-relational databases may include, but are not limited to, blockchain-based distributive databases. The processors involved with each of the embodiments provided in this patent may include, but are not limited to, general-purpose processors, central processing units, graphics processors, digital signal processors, programmable logic devices, data processing logic devices based in quantum computing, etc.

The above embodiments may be combined arbitrarily, and for conciseness, not all possible combinations of the technical features of the aforementioned embodiments have been described, however, as long as no contradiction is example within a particular combination of these technical features, all such combinations shall be considered within the scope of the present disclosure.

It should be understood that embodiments described herein should be considered in a descriptive sense only and not for purposes of limitation. Descriptions of features or aspects within each embodiment should typically be considered as available for other similar features or aspects in other embodiments. While embodiments have been described with reference to the figures, it will be understood by those of ordinary skill in the art that various changes in form and details may be made therein without departing from the spirit and scope as defined by the following claims and their equivalents.

What is claimed is:

1. A method for capturing video, the method performed by at least one processor and comprising:
   during a process of capturing video content by a recording equipment, based on detecting missing-object content in which a target object is not included in a frame, determining previously recorded video content containing the target object from the video content recorded and obtaining location information for the target object in the previously recorded video content;
   decreasing a zoom factor of the recording equipment and obtaining a post-decrease zoom factor;
   based on the location information obtained for the target object, adjusting the recording equipment's capturing direction; and
   performing reidentification of the target object and continuing to capture video content with the target object included in the frame based on at least one of the post-decrease zoom factor and the post-adjustment capturing direction.

2. The method of claim 1, further comprising:
   determining specifications of key parts of the target object in a current video content that comprises the target object;
   adjusting the zoom factor of the current video content based on discrepancy between the specifications of key parts of the target object and preset specifications to obtain the post-decrease zoom factor; and
   continuing to capture video content of the target object based on the post-decrease zoom factor.

3. The method of claim 1, further comprising:
   obtaining reference features of the target object;
   completing feature extraction for candidate target objects from the captured video content, and obtaining features of the candidate target objects;
   determining a level of similarity between the features of the candidate target objects and the reference features; and
   detecting missing-object content from each segment of the captured video content by determining which content comprises characteristics corresponding to that from which the target object is known to be missing.

4. The method of claim 1, further comprising:
   obtaining a number of consecutive frames from which the target object is missing from a multi-frame video content recorded during a current session, and obtaining a number of consecutive missing object frames; and
   based on the number of the consecutive missing object frames satisfying requirements for detection of a missing object, recording the multi-frame video content during the current session being considered to be missing-object content.

5. The method of claim 1, further comprising:
   determining the previously recorded video content containing the target object from video content recorded during the current session; and
   identifying in which areas in a vicinity of the boundary of the frame the target object is located from the previously recorded video content.

6. A method for capturing video, the method performed by at least one processor and comprising:
   during a process of capturing video content by a recording equipment, based on detecting missing-object content in which a target object is not included in a frame, decreasing a zoom factor of the recording equipment and obtaining a post-decrease zoom factor, wherein the decreasing the zoom factor includes using video content recorded prior to the missing-object content to obtain information regarding a location of the target object, a timestamp of the video content recorded prior to the missing-object content being earlier than a timestamp of the missing-object content;

based on the location information obtained for the target object, adjusting a recording equipment's capturing direction, obtaining a post-adjustment recording direction of the recording equipment;

based on the target object being located at a left boundary of the frame in the previously recorded video content, adjusting the recording equipment's capturing direction based on the left boundary position; and based on the target object being located at a right boundary of the frame in the previously recorded video content, adjusting the recording equipment's capturing direction based on the right boundary position;

performing reidentification of the target object based on the post-adjustment recording direction and continuing to capture video content with the target object included in the frame based on an adjustment recording direction.

7. The method of claim 1, further comprising:
from a range of values between the zoom factor while recording missing-object content and a preset zoom factor, gradually decreasing the recording equipment's zoom factor; and
obtaining a gradually decreasing zoom factor that is the post-decrease zoom factor.

8. The method of claim 7, further comprising:
switching a lens included in the recording equipment to a second lens based on a requirement of the post-decrease zoom factor;
during switching the lens, continuously capturing of video until the lens change to the second lens has been completed;
controlling the capturing of video content to be identified with the second lens; and
based on reidentification of an object that corresponds to the target object, capturing the reidentified object within the video content by the second lens.

9. The method of claim 7, further comprising:
controlling a gradual increase of the post-decrease zoom factor;
obtaining a post-increase zoom factor;
switching to a second lens based on a requirement of the post-increase zoom factor; and
increasing the post-increase zoom factor, until reaching the zoom factor in use at the time that the missing-object content was being recorded.

10. The method of claim 8, wherein
the lens is at least one of a wide-angle and an ultra-wide angle, the second lens is at least one of a wide-angle and a telephoto lens, and the lens and the second lens each have a range of zoom factors.

11. The method of claim 7, further comprising:
based on the post-decrease zoom factor, increasing a scale of cropping in a true video content;
obtaining the post-increase cropping scale, the true video content being a video content that is captured by the lens;
decreasing a frame enlargement parameter of the true video content;
obtaining the post-decrease frame enlargement parameter;
based on at least one of the post-increase cropping scale and the post-decrease frame enlargement parameter, extracting video content to await reidentification processing from the true video content; and based on the identification of an object that matches the target object from the video content awaiting reidentification processing, continuing capturing of video content comprising the reidentified object.

12. An apparatus comprising:
a gimbal device configured to hold a recording equipment;
at least one memory configured to store program code; and
at least one processor configured to operate according to the program code, the program code including:
communication code configured to cause at least one of the at least one processor to communicate with the recording equipment and receive information from the recording equipment based on a captured video stream having a target object, wherein the recording equipment automatically decreases a zoom factor upon detecting that the target object is missing from the captured video stream; and
direction control code configured to cause at least one of the at least one processor to automatically change a direction of the recording equipment based on the received information, in cooperation with the recording equipment while the recording equipment decreases the zoom factor, in order to relocate the missing object target object.

13. The apparatus according to claim 12, further comprising:
zoom-decreasing code configured to cause at least one of the at least one processor to, during a process of capturing video content by the recording equipment, based on detecting missing-object content in which the target object is not included in a frame, decrease the zoom factor of the recording equipment and obtain a post-decrease zoom factor; and
reidentification code configured to cause at least one of the at least one processor to reidentify the target object and continue to capture video content with the target object included in the frame based on at least one of the post-decrease zoom factor.

14. The apparatus of claim 13,
wherein the zoom-decreasing code is configured to cause at least one of the at least one processor to decrease the zoom factor using video content recorded prior to the missing-object content to obtain information regarding a location of the target object, a timestamp of the video content recorded prior to the missing-object content being earlier than a timestamp of the missing-object content;
further comprising adjusting code configured to cause at least one of the at least one processor to:
based on the location information obtained for the target object, adjust the recording equipment's capturing direction,
obtain a post-adjustment recording direction of the recording equipment;
based on the target object being located at a left boundary of the frame in the previously recorded video content, adjust the recording equipment's capturing direction based on the left boundary position; and
based on the target object being located at a right boundary of the frame in the previously recorded video content, adjust the recording equipment's capturing direction based on the right boundary position; and wherein the reidentification code is configured to cause at least one of the at least one processor to perform reidentification of the target object based on the post-adjustment recording direction and continue to capture video content with the target object included in the frame based on an adjustment recording direction.

15. The apparatus of claim 14, wherein the zoom-decreasing code is further configured to cause at least one of the at least one processor to:

from a range of values between the zoom factor while recording missing-object content and the preset zoom factor, gradually decrease the recording equipment's zoom factor; and obtain a gradually decreasing zoom factor that is the post-decrease zoom factor.

16. The apparatus of claim 15, further comprising control code configured to cause at least one of the at least one processor to:

switch a lens included in the recording equipment to a second lens based on a requirement of the post-decrease zoom factor;

during switching the lens, continuously capture video until the lens change to the second lens has been completed;

control the capturing of video content to be identified with the second lens; and based on reidentification of an object that corresponds to the target object, capture the reidentified object within the video content by the second lens.

17. The apparatus of claim 15, further comprising control code configured to cause at least one of the at least one processor to:

control a gradual increase of the post-decrease zoom factor;

obtain a post-increase zoom factor; switch to a second lens based on a requirement of the post-increase zoom factor; and increase the post-increase zoom factor, until reaching the zoom factor in use at the time that the missing-object content was being recorded.

18. The apparatus of claim 16, wherein the lens is at least one of a wide-angle lens and an ultra-wide angle lens, the second lens is at least one of a wide-angle lens and a telephoto lens, and the lens and the second lens each have a range of zoom factors.

19. The apparatus of claim 14, wherein the program code is further configured to cause at least one of the at least one processor to:

based on the post-decrease zoom factor, increase a scale of cropping in a true video content;

obtain the post-increase cropping scale, the true video content being a video content that is captured by the lens;

decrease a frame enlargement parameter of the true video content;

obtain the post-decrease frame enlargement parameter;

based on at least one of the post-increase cropping scale and the post-decrease frame enlargement parameter, extract video content to await reidentification processing from the true video content; and based on the identification of an object that matches the target object from the video content awaiting reidentification processing, continue capturing of video content comprising the reidentified object.

20. A gimbal device configured to hold a mobile phone, comprising:

at least one memory configured to store program code; and at least one processor configured to operate according to the program code, the program code including:

communication code configured to cause at least one of the at least one processor to communicate with the mobile phone and receive information from the mobile phone based on a captured video stream having a target object, wherein the mobile phone automatically decreases a zoom factor upon detecting that the target object is missing from the captured video stream; and direction control code configured to cause at least one of the at least one processor to automatically change a direction of the mobile phone based on the received information, in cooperation with the mobile phone while the mobile phone decreases the zoom factor, in order to relocate the missing object target object.

21. The gimbal device of claim 20, wherein the mobile phone decreases the zoom factor based on video content recorded prior to the missing-object content to obtain information regarding a location of the target object, a timestamp of the video content recorded prior to the missing-object content being earlier than a timestamp of the missing-object content;

further comprising:

adjusting code configured to cause at least one of the at least one processor to:

based on the location information obtained for the target object, adjust the mobile phone's capturing direction, obtain a post-adjustment recording direction of the recording equipment;

based on the target object being located at a left boundary of the frame in the previously recorded video content, adjust the mobile phone's capturing direction based on the left boundary position; and based on the target object being located at a right boundary of the frame in the previously recorded video content, adjust the mobile phone's capturing direction based on the right boundary position; and reidentification code configured to cause at least one of the at least one processor to perform reidentification of the target object based on the post-adjustment recording direction and to continue to capture video content with the target object included in the frame based on the adjusted recording direction.

* * * * *